(12) United States Patent
Serizawa et al.

(10) Patent No.: US 6,343,197 B1
(45) Date of Patent: Jan. 29, 2002

(54) IMAGE FORMATION PROCESSING HAVING IMAGE ROTATION FUNCTION

(75) Inventors: Masahiro Serizawa; Yoshihito Osari, both of Shizuoka-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/450,752

(22) Filed: Nov. 30, 1999

(30) Foreign Application Priority Data

Nov. 30, 1998 (JP) ............................................ 10-353815
Nov. 30, 1998 (JP) ............................................ 10-353816

(51) Int. Cl.$^7$ ............................................ G03G 21/00
(52) U.S. Cl. ............................ 399/82; 399/83; 399/363
(58) Field of Search ............................ 399/363, 82–83, 399/86; 382/296, 286, 289, 293

(56) References Cited

U.S. PATENT DOCUMENTS 5,550,623 A * 8/1996 Tomita et al. ................. 399/83
5,943,449 A * 8/1999 Yoshida ....................... 382/296
6,088,568 A * 7/2000 Ohtani ........................ 399/408

FOREIGN PATENT DOCUMENTS

JP 11-216925 * 8/1999

* cited by examiner

*Primary Examiner*—Quana M. Grainger
(74) *Attorney, Agent, or Firm*—Fitzpatrick, Cella, Harper & Scinto

(57) ABSTRACT

Image forming apparatus including a sheet feeder for feeding a sheet, a sheet size detector for detecting a size of the sheet fed by the sheet feeder, the sheet size includes an orientation of the sheet, an image size detector for detecting a size of an image to be formed, the image size includes an orientation of the image, an image rotator for rotating the image, an image forming unit for forming the image on the sheet fed by the sheet feeder, an operation panel for inputting a cover/sheet insertion mode, a staple mode, or a different size documents mode, and a controller for controlling the image rotator in accordance with detection results of the sheet size detector and image size detector, and for inhibiting the image rotation by the image rotator in a case where the cover/sheet insertion mode, staple mode, or different size documents mode is input from the operation panel.

48 Claims, 20 Drawing Sheets

FIG.9

| SELECT COPY OR NOT | | | | CANCEL |
|---|---|---|---|---|
| COVER | | COPY | NOT COPY | |
| BACK COVER | | COPY | NOT COPY | |
| INSERT SHEET | | COPY | NOT COPY | |
| | | | | OK |

FAX STATUS/STOP TRANSMISSION

FIG.10

INPUT PAGE NUMBER INDICATING SHEET SHOULD BE INSERTED

CANCEL

| FIRST | → | IN FRONT OF PAGE 2 |
| SECOND | → | IN FRONT OF PAGE 4 |
| THIRD | → | IN FRONT OF PAGE 5 |
| FOURTH | → | IN FRONT OF PAGE 8 |
| FIFTH | → | IN FRONT OF PAGE 12 |
| SIXTH | → | IN FRONT OF PAGE 155 |
| SEVENTH | → | PAGE |

1/1

TOUCH ITEM

OK

FAX STATUS/STOP TRANSMISSION

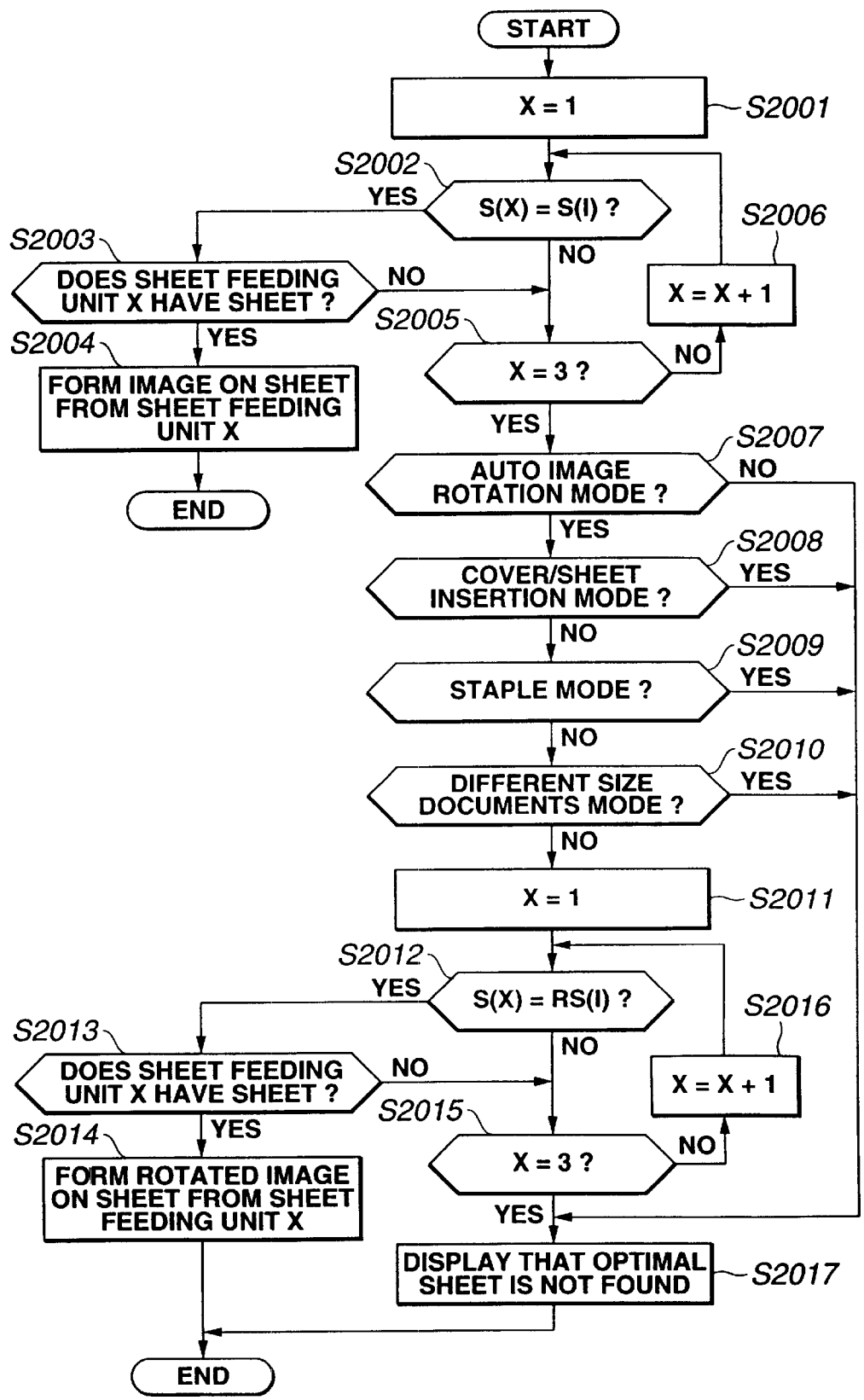

IMAGE FORMATION PROCESSING HAVING IMAGE ROTATION FUNCTION

BACKGROUND OF THE INVENTION

1. Field of the Invention

The present invention relates to an image formation processing having an image rotation function for conforming an orientation of an image to an orientation of a sheet.

2. Description of the Related Art

Conventional copy machines have an image rotation function for conforming an orientation of a document and an orientation of a sheet. The copy machine rotates an image of the document by 90 degrees by using the memory therein. The image rotation function is not a function such as a magnification being changed for each copy but is a function which is rarely changed once the function is designated. Therefore, the image rotation function is not changed by a direct key such as a reset key, a magnification key on an operation panel, or the like. The image rotation function is changed by several complicated key actions. Thereby, preventing accidental cancellation of the image rotation function. The copy machine has an auto sheet selection function by which the copy machine selects a sheet feeding unit automatically in accordance with a document size including an orientation of the document.

On the other hand, conventional copy machines have a cover/sheet insertion function by which the copy machine feeds a cover sheet or inserts a sheet from a predetermined sheet feeding unit on a predetermined page. Another conventional copy machine has a different size documents feeding function which the copy machine selects a sheet feeding unit each time a document is fed in accordance with a document size. Another certain copy machine has a staple function which the copy machine staples copy sheets.

However, when a copy machine performs the image rotation function, the auto sheet selection function, and the cover/sheet insertion function in the same job, the orientation of the cover sheet or the insert sheet fed from the predetermined sheet feeding unit may be different from the orientation of the plain sheet fed from the sheet feeding unit selected by the auto sheet selection function and the selected image rotation function. In this situation, the user must orient these sheets.

There exists another problem, when a copy machine performs the image rotation function, the auto sheet selection function, and the different size documents function in the same job, a problem similar to the above problem may arise. That is, when documents comprising A4 documents and A3 documents are set on the copy machine having only A4R sheets and A3 sheets but not A4 sheets, the copy machine copies the A4 document onto the A4R sheet, the A3 document onto the A3 sheet. If the user wants to bind the long edge of A4R sheet and the short edge of A3 sheet together, the user must orient these sheets. Another problem exists when a copy machine performs the image rotation function, the auto sheet selection function, and the staple function in the same job. In this case, the copy machine will change from a sheet feeding unit having A4 size sheets to a sheet feeding unit having A4R size sheets in the middle of the job because of a luck of a paper in another sheet feeding unit having A4 size sheets. In this situation, these different oriented sheets are stapled together.

SUMMARY OF THE INVENTION

An object of the present invention is to provide image forming processing which can prevent the image rotation function causing situations which the user does not want.

In order to achieve the above object, the present invention provides image forming apparatus comprising a sheet feeder for feeding a sheet, a sheet size detector for detecting a size of the sheet fed by the sheet feeder, the sheet size includes an orientation of the sheet, an image size detector for detecting a size of an image to be formed, the image size includes an orientation of the image, an image rotator for rotating the image, image forming means for forming the image on the sheet fed by the sheet feeder, a terminal for inputting a designation of a sheet handling, and a controller for controlling the image rotator in accordance with detection results of the sheet size detector and image size detector, and for inhibiting the image rotation by the image rotator in case where a predetermined sheet handling designation is input from the terminal.

Other objects and features of the invention will be apparent from the following description and the drawings.

BRIEF DESCRIPTION OF THE DRAWINGS

FIG. 9 shows a screen displayed on the operation panel.

FIG. 10 shows a screen displayed on the operation panel.

FIG. 20 shows a flowchart for executing an auto sheet selection function in the second embodiment.

DESCRIPTION OF THE PREFERRED EMBODIMENTS

Figure 1:
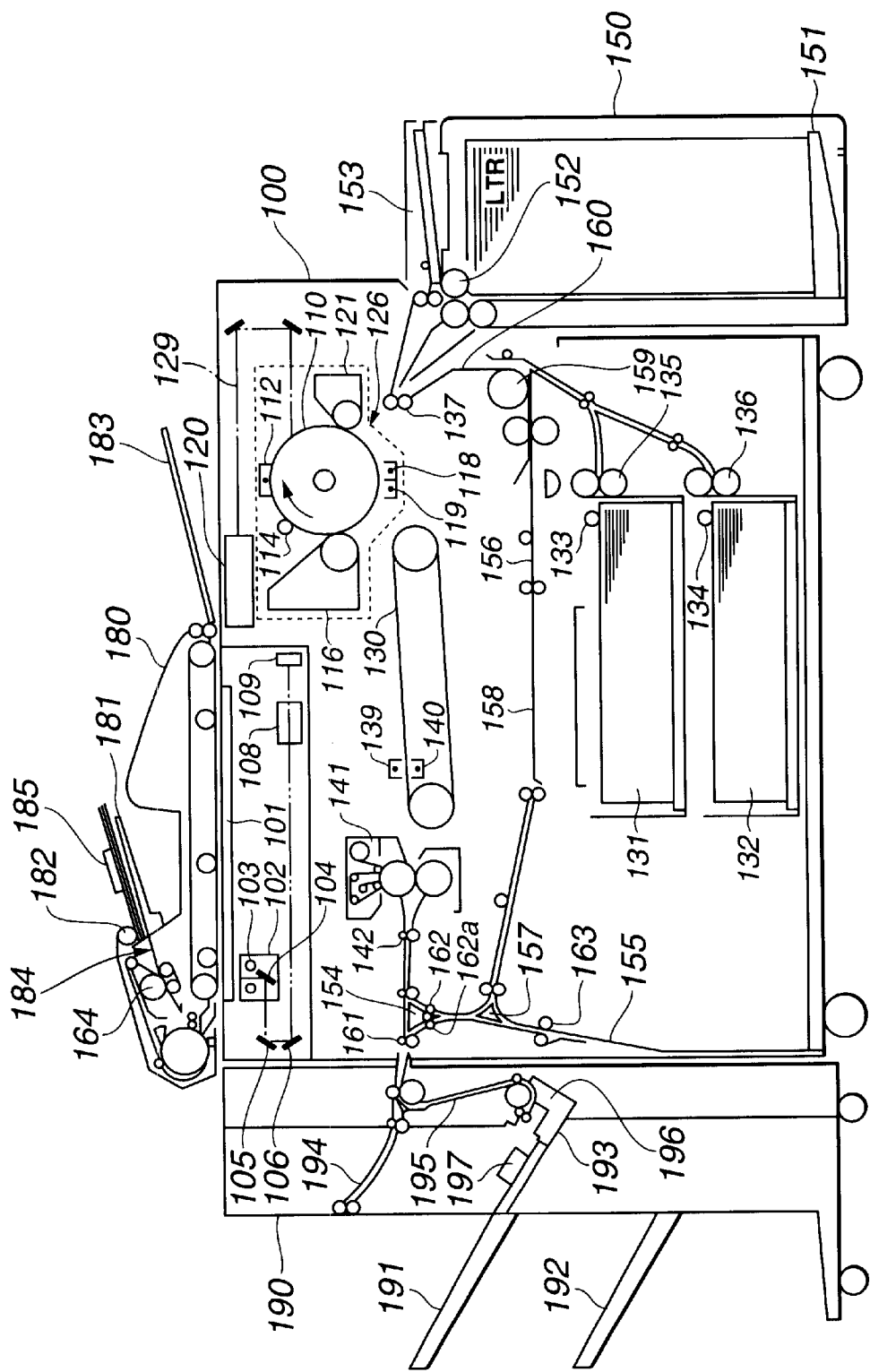
FIG. 1 shows a cross section of an image forming apparatus.

FIG. 1 shows a cross section of an image forming apparatus. Numeral 100 indicates the main body of the image forming apparatus. Numeral 101 indicates a plate glass onto which a document is set. Scanner 102 includes document exposure lamp 103, scanning mirror and 104. Scanner 102 is driven by a motor (not shown) and scans the document set on plate glass 101. The reflected light from the document is directed to CCD sensor 109 through scanning mirrors 104, 105, and 106 and lens 108.

Numeral 120 indicates exposure control unit comprising a laser beam unit and polygon mirror. Exposure control unit 120 emits a laser beam to photosensitive drum 110 of image forming unit 126. Laser beam 129 is emitted in accordance with image data read by CCD sensor 109.

Image forming unit 126 has first charging unit 112, developing unit 121, transfer charging unit 118, cleaning unit 116, and pre-exposure lamp 114 around photosensitive drum 110. Photosensitive drum 110 is rotated in the direction shown by the arrow.

Photosensitive drum 110 is charged at a predetermined voltage by first charging unit 112 and then exposed by laser beam 129 from exposure control unit 120. Thereby, a latent image is formed on photosensitive drum 110. The latent image is developed by developing unit 121. Thereby, the latent image is visualized as a toner image. Meanwhile, a sheet is fed from upper cassette 131 or lower cassette 132 by pickup roller 133 or 134 and fed to image forming unit 126 by feed roller 135 or 136 and registration roller 137. The visualized toner image is then transferred onto sheet transfer charging unit 118.

After transferring the toner image, the remaining toner on photosensitive drum 110 is cleared by cleaning unit 116, and the remaining charge is removed by pre-exposure lamp 114. The sheet holding the toner image is separated from transferring belt 130 and charged by charging unit 139 and 140. Then, the sheet is transported into fixing unit 141. The toner image on the sheet is fixed by the pressure and heat of fixing unit 141. The fixed sheet is discharged from main body 100 by discharge roller 142.

Main body 100 has sheet deck 150 which can hold, for example, 4000 sheets. Lifter 151 lifts the sheets in sheet deck 150 in accordance with the amount of sheets so that the top of the stack of sheets reaches feed roller 152. Main body also has manual feed unit 153 which can hold 100 sheets. Upper cassette 131, lower cassette 132, sheet deck 150, and manual feed unit 153 are referred as sheet feed units.

Discharge flapper 154 makes either a discharge path or a re-feed path. The sheet is lead to re-feed tray 156 through roller 162 and 163, reversing path 155, and re-feed path 158 when a two sided copy is requested. The sheet is lead to re-feed tray 156 through roller 162 and re-feed path 158 without going through reversing path 155 when a multiple copy is done. Flapper 157 leads the sheet to either reversing path 155 or re-feed path 158. Roller 159 feeds the sheet to image forming unit 126 through path 160.

Discharge roller 161 is provided near discharge flapper 154 and discharges the sheet led by discharge flapper 154 out of main body 100. When the sheet is discharged upside down, the sheet is led to reversing path 155 through 162 and then led to discharge roller 161 through 162a by discharge flapper 154.

Numeral 180 indicates a document feeder. Pick up roller 182 picks up a document among documents placed on document tray 181. Feed roller 164 feeds to plate glass 101 the document picked up by pick up roller 182. The original is discharged to discharge tray 183 or original tray 181 after the original on plate glass 101 is scanned by scanner 102.

Sheet processing apparatus 190 jogs sheets by jogger 197 and staples the sheets by stapler 196. In case a sort mode and a staple mode are not designated by operation panel 172, a sheet is discharged on discharge tray 191 through path 194. In case either the sort mode or the staple mode is designated by operation panel 172, a sheet is transported to processing tray 193 through 195 and jogged on processing tray 193. The sheets stacked on processing tray 193 are stapled and discharged to either discharge tray 191 or 192 when the image formation of a group of image is finished. Discharge tray 191 and 192 is moved vertically by a motor which is not shown. A selected tray among discharge tray 191 and 192 is moved adjacent to processing tray 193.

Figure 2:
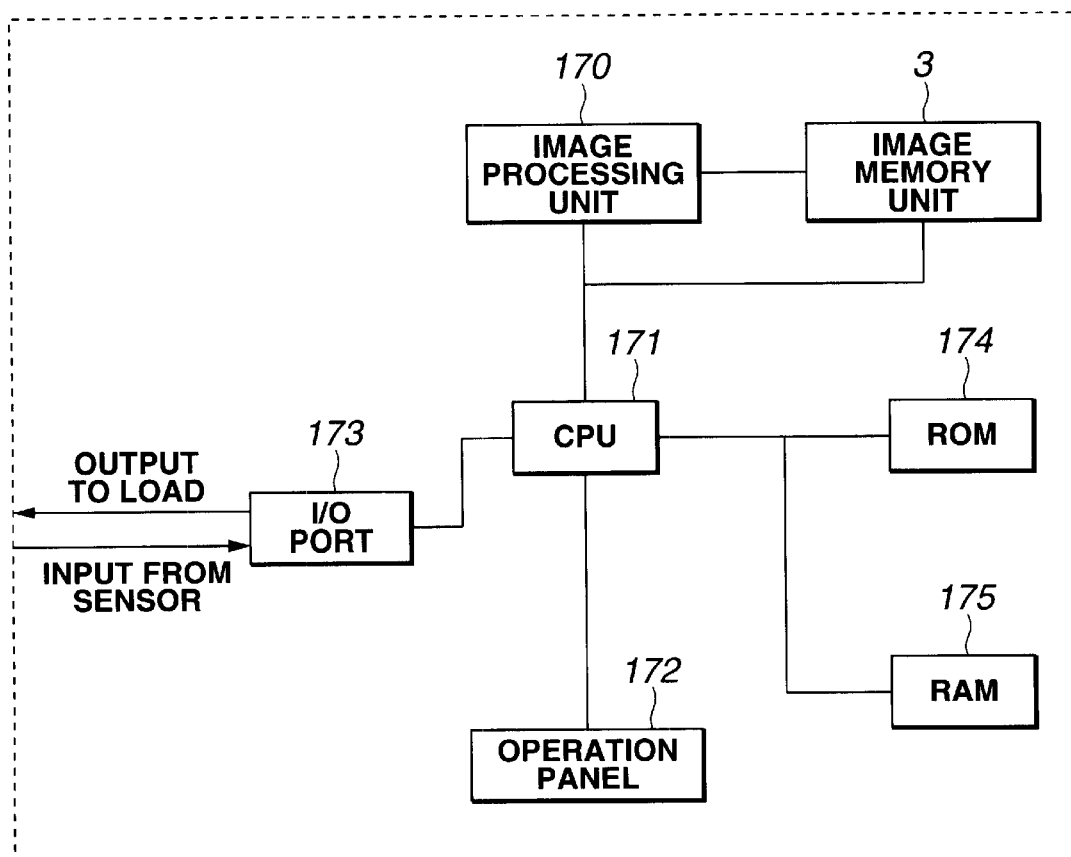
FIG. 2 shows a block diagram of the control unit provided in the image forming apparatus.

FIG. 2 shows a block diagram of control unit provided in image forming apparatus 100. CPU 171 controls image forming apparatus 100 and is connected to ROM 174, RAM 175, and I/O port 173 through an address bus and a data bus. ROM 174 stores a control program. RAM 175 is used for a work area when processing is executed. RAM 175 can store the control program for executing by CPU 171. CPU 171 controls image forming apparatus 100 in accordance with the control program stored in ROM 174 or RAM 175. The control program could be stored in a memory medium such as a floppy disc and a CD-ROM, and could be read by CPU 171.

I/O port 173 is connected to various load units such as a motor and a clutch in image forming apparatus 100 and to various input units such as a sensor for detecting a sheet in image forming apparatus 100. CPU 171 controls an image forming process and a signal exchange of I/O port 173 in accordance with the control program stored in ROM 174. CPU 171 is also connected to operation panel 172. CPU 171 controls a display and keys of operation panel 172. The operator designates image forming modes and changes display contents by using the keys of operation panel 172. CPU 171 controls the display of operation panel 172 to display a status of image forming apparatus 100 and modes designated by the keys.

CPU 171 is also connected to image processing unit 170 and image memory unit 3. Image processing unit 170 processes an image signal output from image sensor 109. Image memory unit 3 stores image data processed by image processing unit 170. Image processing unit 170 and image memory unit 3 will be described hereinafter.

Figure 3:
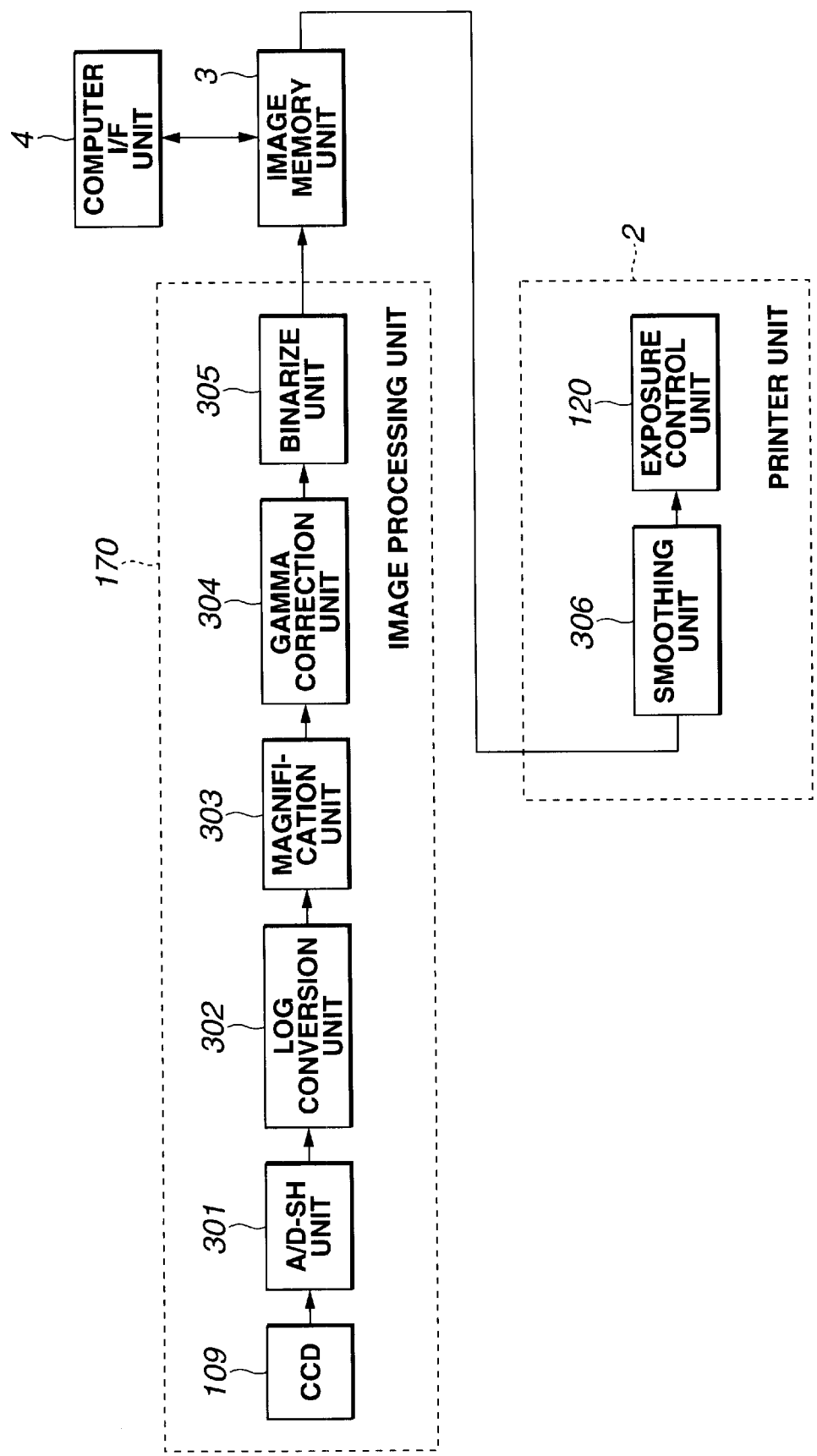
FIG. 3 shows a block diagram regarding an image processing unit and an image memory unit.

FIG. 3 shows a block diagram regarding image processing unit 170 and image memory unit 3. The reflected light from the document is converted to analog signal by CCD sensor 109. The analog signal is converted to digital signal by analog to digital—sample and hold (A/D-SH) unit 301. A shading compensation of the digital signal is conducted by A/D-SH unit 301.

Log conversion unit 302 stores lookup table for converting from luminance data to density data. Log conversion unit 302 converts from luminance data to density data in accordance with the lookup table. Magnification unit 303 magnifies image data in accordance with the desired magnification. Gamma correction unit 304 corrects image data in accordance with a density value designated by operation panel 172. Binarize unit 305 binarizes multi-value image data.

Figure 4:
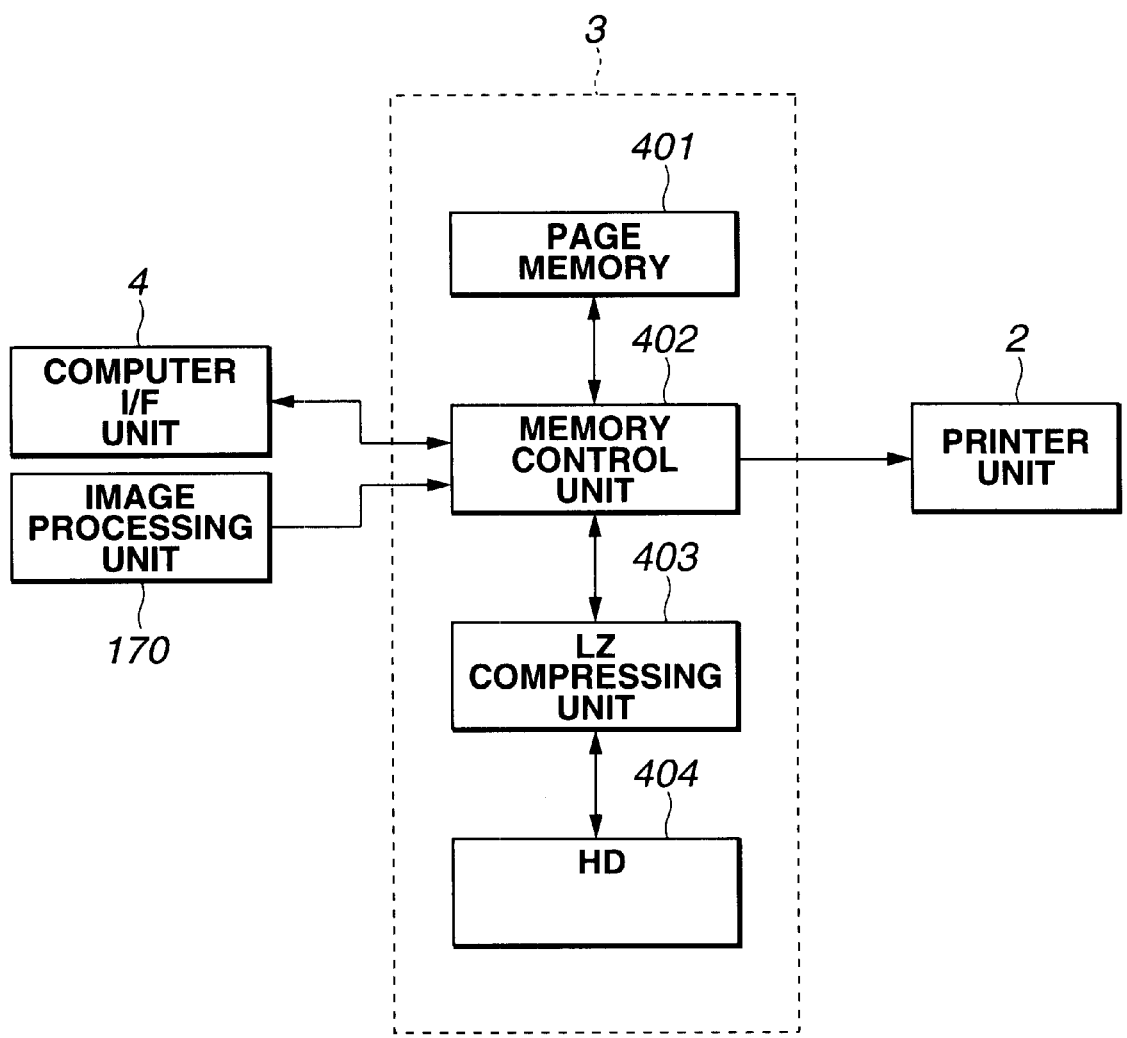
FIG. 4 shows a block diagram of the image memory unit.

Binarized image data are stored in image memory unit 3. Image data received from a computer through computer I/F unit 4 are stored in image memory unit 3. As shown in FIG. 4, image memory 3 includes page memory 401 and hard disc 404. Page memory 401 is suitable for high speed processing. Hard disc 404 is able to store many pages of image data. The image data stored in hard disc 404 are output in the order according to an edit mode designated by operation panel 172. For example, when a sort mode is designated, the image data are read out in the order which the documents are scanned. This read out process is repeated a designated number of times corresponding to a number of copies. Thereby, copied sheets are sorted.

The image data output from image memory unit 3 are sent to smoothing unit 306. Smoothing unit 306 does interpolation of the image data in order to smooth the edge of the binarized image. The interpolated image data are sent to exposure control unit 120. Exposure control unit 120 emits a laser beam as described above.

FIG. 4 shows a block diagram of image memory unit 3. Image memory unit 3 comprises page memory 401, memory control unit 402, LZ compression unit 403, hard disc 404. Memory control unit 402 controls page memory 401 to store the binarized image data sent from I/F unit 4 and image processing unit 170. Memory control unit 402 controls an exchange of image data between hard disc 404 and page memory 401. Memory control unit 402 generates DRAM refresh signal to page memory 401. Memory control unit 402 decides a writing address, a writing direction, a reading address, and a reading direction on page memory 401 in accordance with a indication from CPU 171. Thereby, image editing is done, such as image rotating, image trimming, and image masking.

Figure 5:
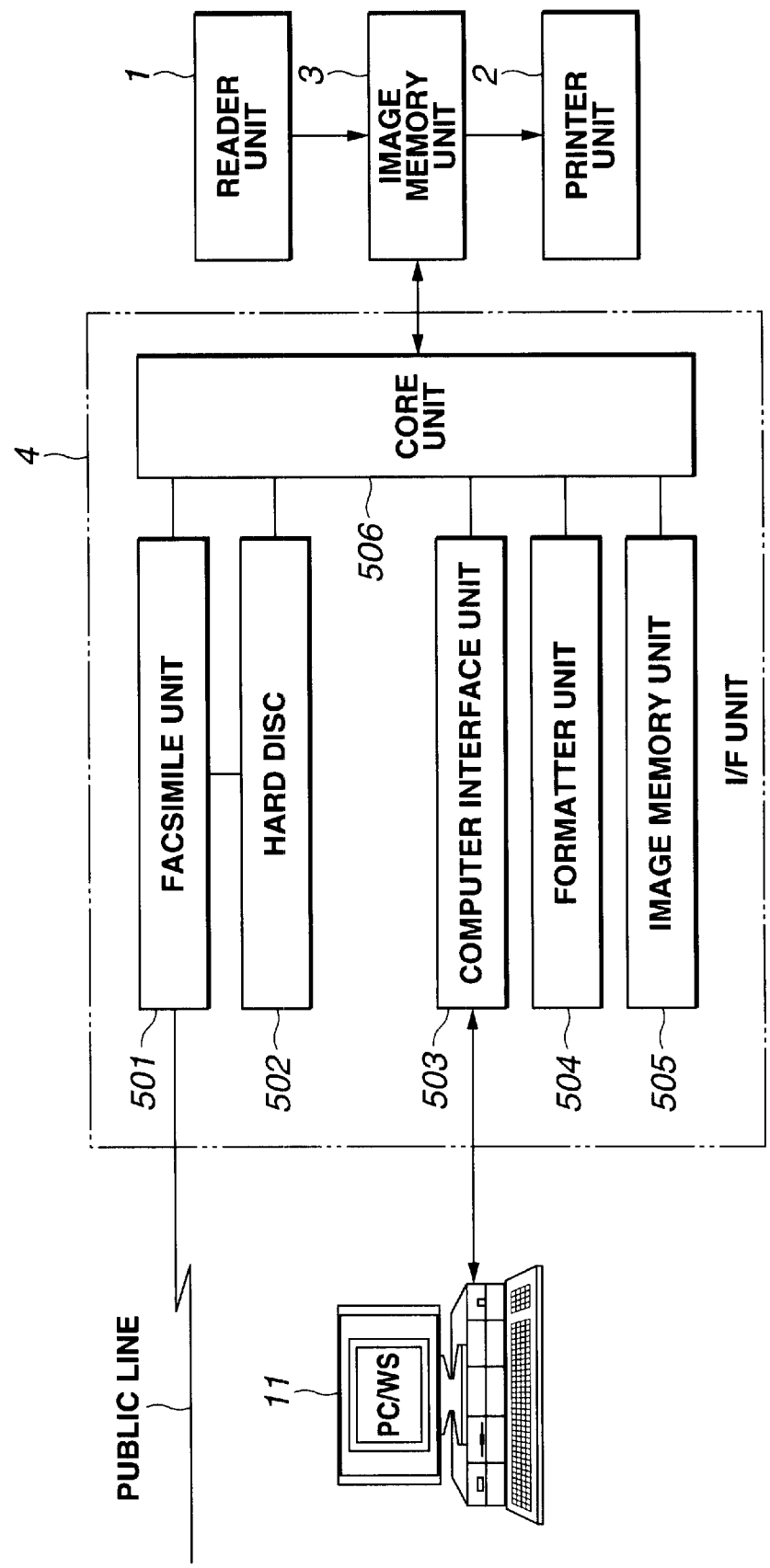
FIG. 5 shows a block diagram of an I/F unit.

FIG. 5 shows a block diagram of I/F unit 4. I/F unit 4 inputs binarized image data from reader unit 1 through image memory unit 3. I/F unit 4 outputs the binarized image data to printer unit 2 through image memory unit 3. I/F unit 4 comprises core unit 506, facsimile unit 501, hard disc 502, computer interface unit 503, formatter unit 504, and image memory unit 505.

Facsimile unit 501 is connected to a public line. Facsimile unit 501 receives facsimile data from the public line and transmits facsimile data to the public line. Facsimile unit 501 sends facsimile data stored in image memory unit 505 at a designated time. Facsimile unit 501 sends facsimile data stored in image memory unit 501 in accordance with a password received from another facsimile apparatus. Computer interface unit 503 is an interface for communicating with personal computer 11. Computer interface unit 503 has a local area network (LAN), serial interface, SCSI interface, Centronics interface. The status of reader unit 1 and printer unit 2 are informed to personal computer 11 through computer interface unit 503. Image data read by reader unit 1 is transferred to personal computer 11 through computer interface unit 503.

Computer interface 11 receives image data from personal computer 11. The image data received from personal computer 11 are written in special code. Formatter unit 504 converts the special code to raster image data which can be printed by printer unit 2. Image memory unit 505 stores raster image data converted by formatter unit 504.

Image memory unit 505 is also used for sending image data received from reader unit 1 to personal computer 11. That is, when image data received from reader unit 1 is sent to personal computer 11 through computer interface unit 503, image data received from image memory unit 3 is stored in image memory unit 505 and is converted to data format for sending to personal computer 11. The converted data is sent to personal computer 11 through computer interface unit 503.

Core unit 506 controls a data transfer between facsimile unit 501, computer interface unit 503, formatter unit 504, and image memory unit 3.

Figure 6:
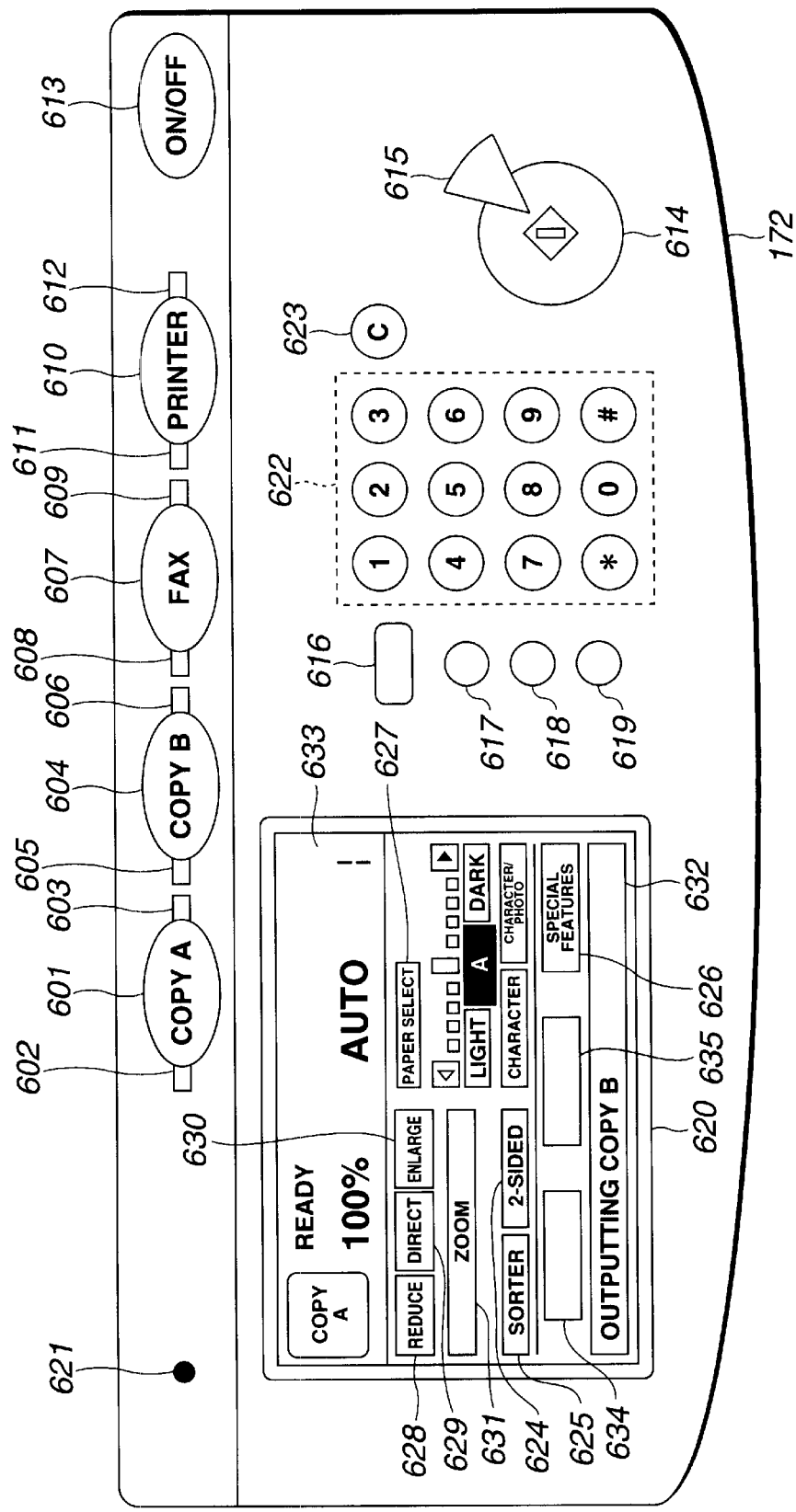
FIG. 6 shows an operation panel.

FIG. 6 shows operation panel 172. Power lamp 621 indicates whether the power of image forming apparatus 100 is on. Keypad 622 is used for inputting the number of copies. Clear key 623 is used for clearing the designation by keypad 622. Reset key 616 is used for resetting the designation on operation panel 172. Start key 614 is used for starting the image formation of image forming apparatus 100. Stop key 615 is used for stopping the image formation of image forming apparatus 100. When a certain key is pressed after information key 617 is pressed, the information of usage of the pressed key is displayed on display panel 620. User key 618 is used for changing the designation of image forming apparatus 100, which would be not changed frequently like an auto image rotation function as described later. Interrupt key 619 is pushed when certain copy must interrupt before another copy has not finished.

The surface of display panel 620 has a touch sensor. FIG. 6 shows an example of a screen for designating a copy mode. Keys 624 through 631 are displayed in display panel 620.

Figure 7:
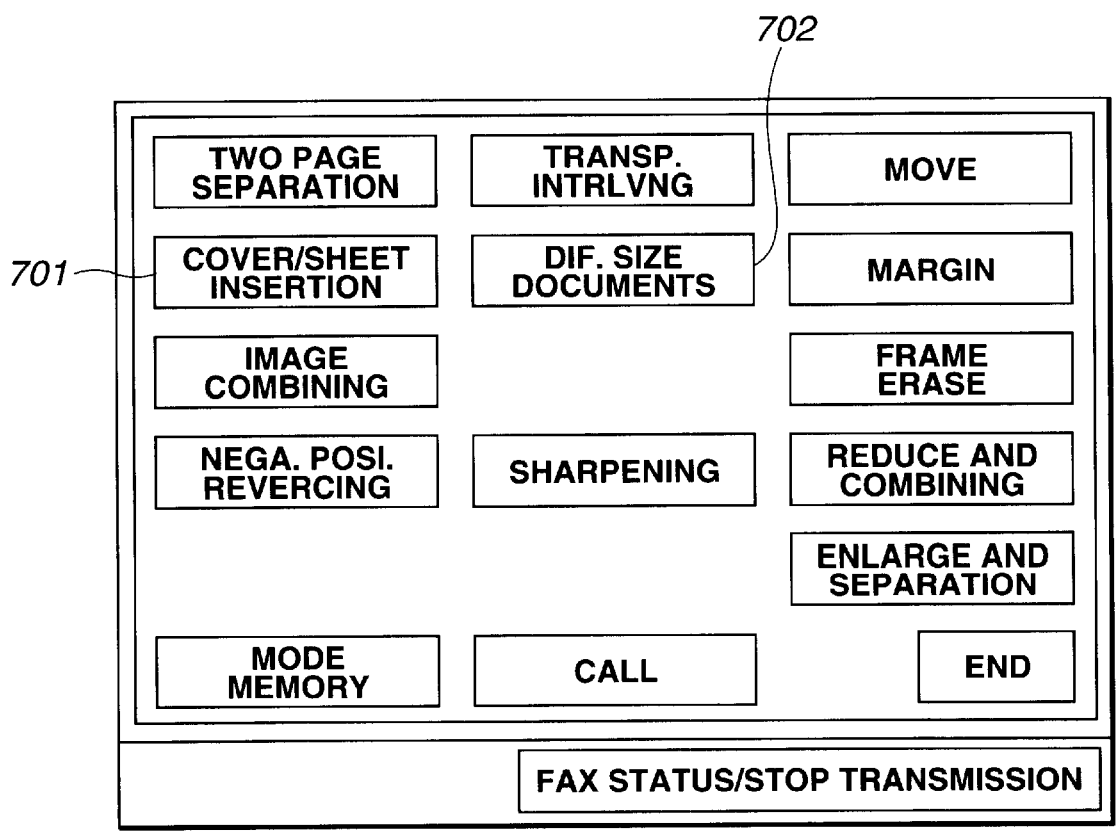
FIG. 7 shows a screen displayed on the operation panel.

When sheet select key 627 is touched, a screen for selecting one of sheet cassette 131, 132, sheet deck 150, and manual feed unit 153 is displayed on display panel 620. Keys 628 through 631 are for designating a copy magnification. When application mode key 626 is touched, a screen for designating application mode, such as multiple copy mode, cover/sheet insertion mode, is displayed on display panel 620 as shown in FIG. 7.

Both side key 624 is for designating a copy mode regarding two sided copy or two sided document. Sort key 625 is for designating a sort mode using image memory unit 3 or sheet processing apparatus 190. A copy mode and a current status are displayed in display area 633. Image forming apparatus 100 has several functions, and the screens corresponding to the several functions are displayed on display panel 620. Display area 633a indicates what screen is displayed. In FIG. 6, display area 633a indicates that a screen of copy A is displayed. Although display area 633a shown in FIG. 6 indicates the function by characters, some marks can be used instead of the characters.

Display area 650 is used for displaying status of the other function. In FIG. 6, display area 650 indicates that image forming apparatus 100 is printing for copy B.

Application mode, which can be designated after application mode key 626 is touched, can be registered in keys 634 and 635. When an application mode is registered in key 634 or 635, the name of the application mode is displayed on key 634 or 635. Thereby, the application mode being used frequently can be selected easily.

Numerals 601, 604, 607, and 610 indicate keys for selecting screen of display panel corresponding to function. Keys 601, 604, 607, and 610 are semitransparent keys and have LED inside. When one of keys 601, 604, 607, and 610 is pressed, the LED of the pressed key is controlled to light, and the LEDs of not pressed keys are controlled not to light.

Green LEDs 603, 606, 609, and 612 indicate status of each function. For example, when copy B is on standby, LED 606 is controlled not to light. When copy B is being printed as shown in FIG. 6, LED 606 is controlled to blink. When the image for copy B is stored in image memory unit 3 and is not being printed, LED 606 is controlled to light. Red LEDs 602, 605, 608, and 611 indicate error of each function. For example, when there is an error such as running out of sheet and sheet jamming, LED 605 is controlled to blink. When key 604 is pressed while LED 605 is blinking, the detail of the error is displayed. Keys 601, 604, 607, and 610 can be pressed at any time for displaying the screen of each function.

Figure 8:
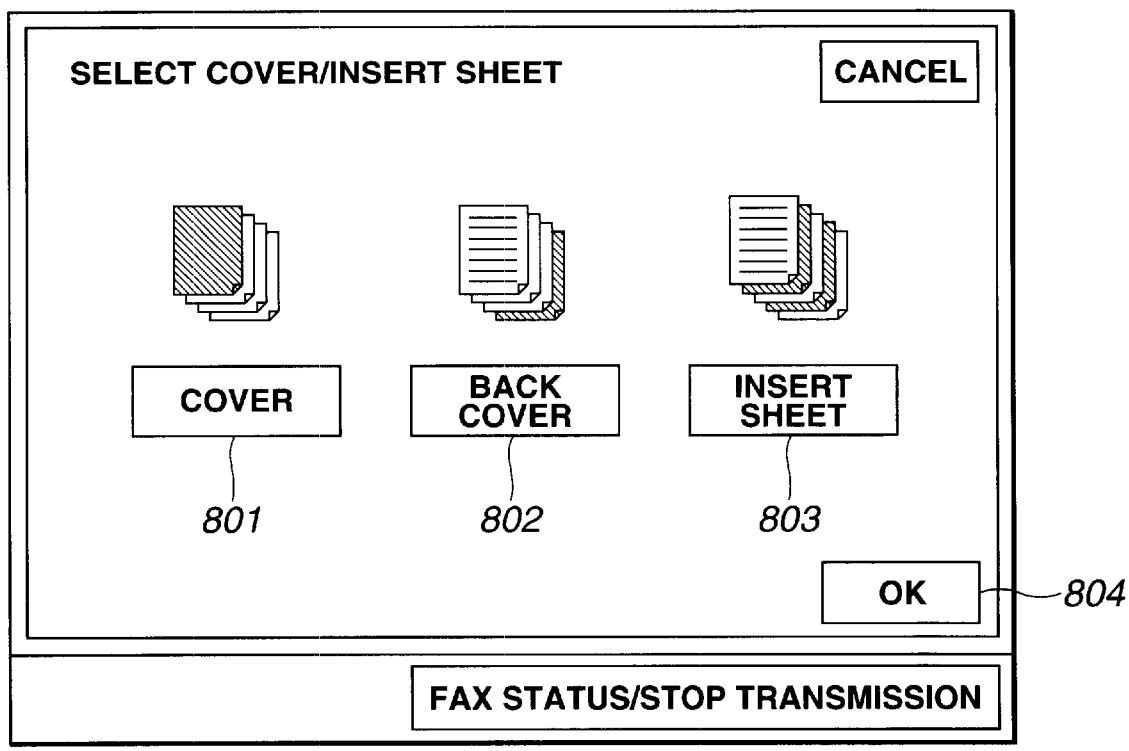
FIG. 8 shows a screen displayed on the operation panel.
Figure 11:
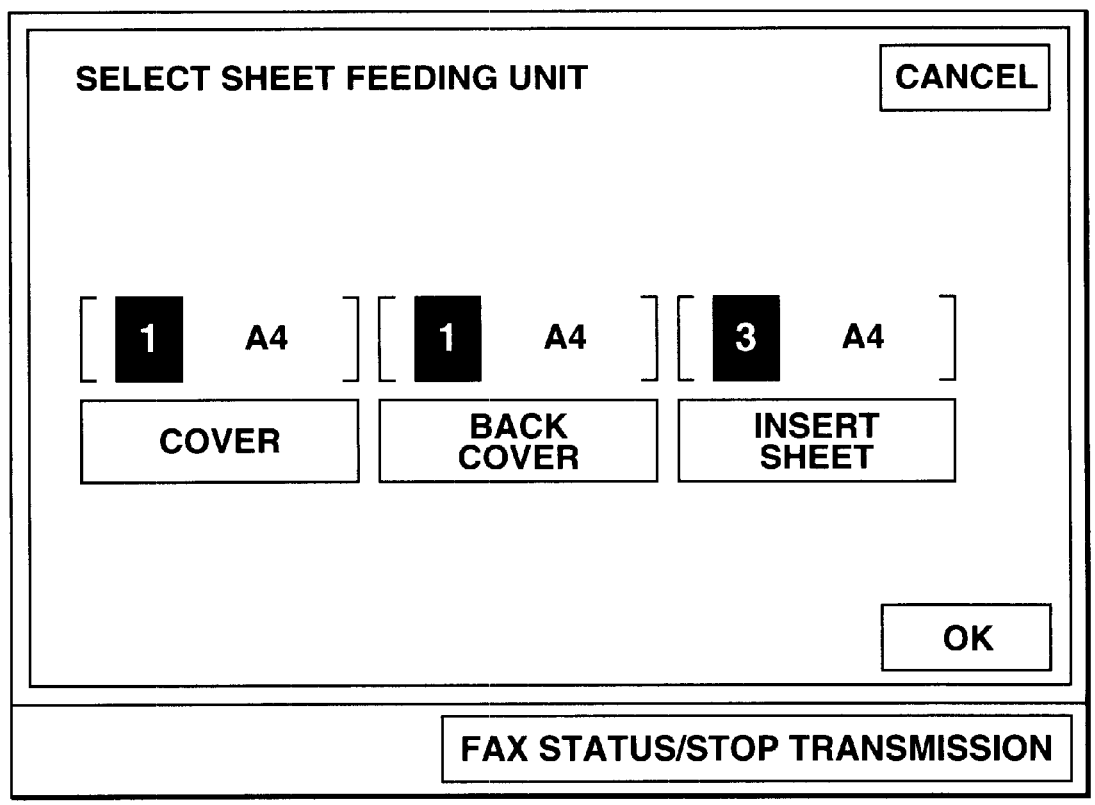
FIG. 11 shows a screen displayed on the operation panel.

FIGS. 8 to 11 indicate screens for designating cover/sheet insertion mode which will be described hereinafter. When key 701 shown in FIG. 7 is touched, the screen shown in FIG. 8 is displayed on display panel 620. Keys 801, 802, and 803 are used for adding a cover sheet, a back cover sheet, and an insert sheet respectively. The cover sheet, the back cover sheet, and the insert sheet can be added at the same time. When key 804 is touched after designating keys 801, 802, and 803, the screen shown in FIG. 9 is displayed on display panel 620. The screen shown in FIG. 9 is for designating whether a copy is made on the cover sheet, the back cover sheet, or the insert sheet. If adding a cover sheet is designated, the screen shown in FIG. 10 is displayed on display panel 620 upon touching the OK key shown in FIG. 9. On the other hand, if adding the cover sheet is not designated, the screen shown in FIG. 11 is displayed.

The screen shown in FIG. 10 is for designating the page where the insert sheet should be inserted. A page number is entered by keypad 622. The insert sheet is inserted in front of the copy sheet of the document having the entered page number.

The screen shown in FIG. 11 is for selecting the feed unit for the cover sheet, the back cover sheet, and the insert sheet. FIG. 11 shows that a feed unit 1 is selected for the cover sheet and the back cover sheet, and a feed unit 3 is selected for the insert sheet. The sheet feed units for the cover sheet, the back cover sheet, and the insert sheet do not have to be the same. However, the sizes of the cover sheet, the back cover sheet, and the insert sheet must be the same. When an OK key in the screen shown in FIG. 11 is touched, the designation of the cover/sheet insertion mode is finished.

Figure 12:
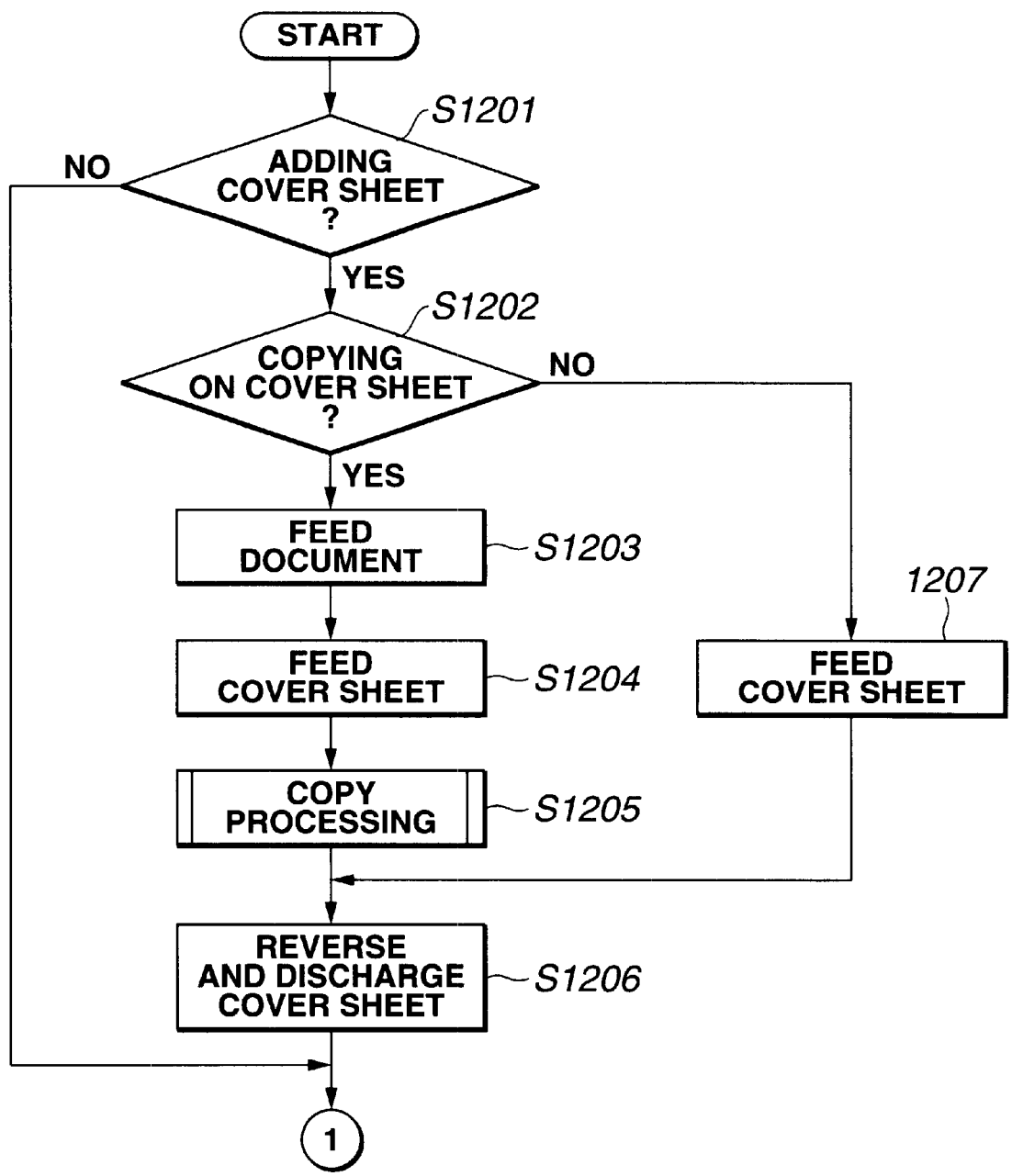
FIG. 12 shows a flowchart for executing a cover/sheet insertion mode.
Figure 13:
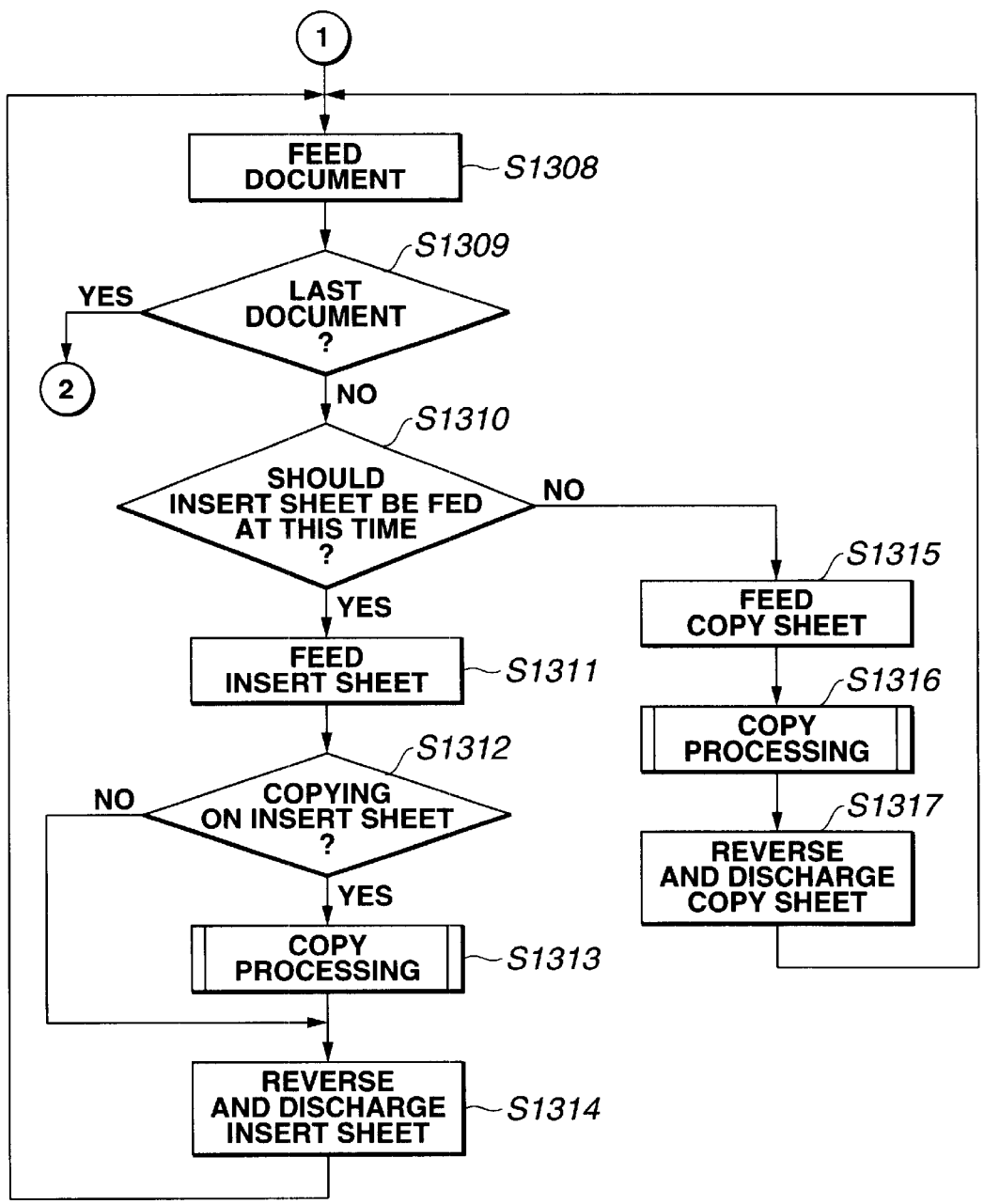
FIG. 13 shows a flowchart for executing a cover/sheet insertion mode.
Figure 14:
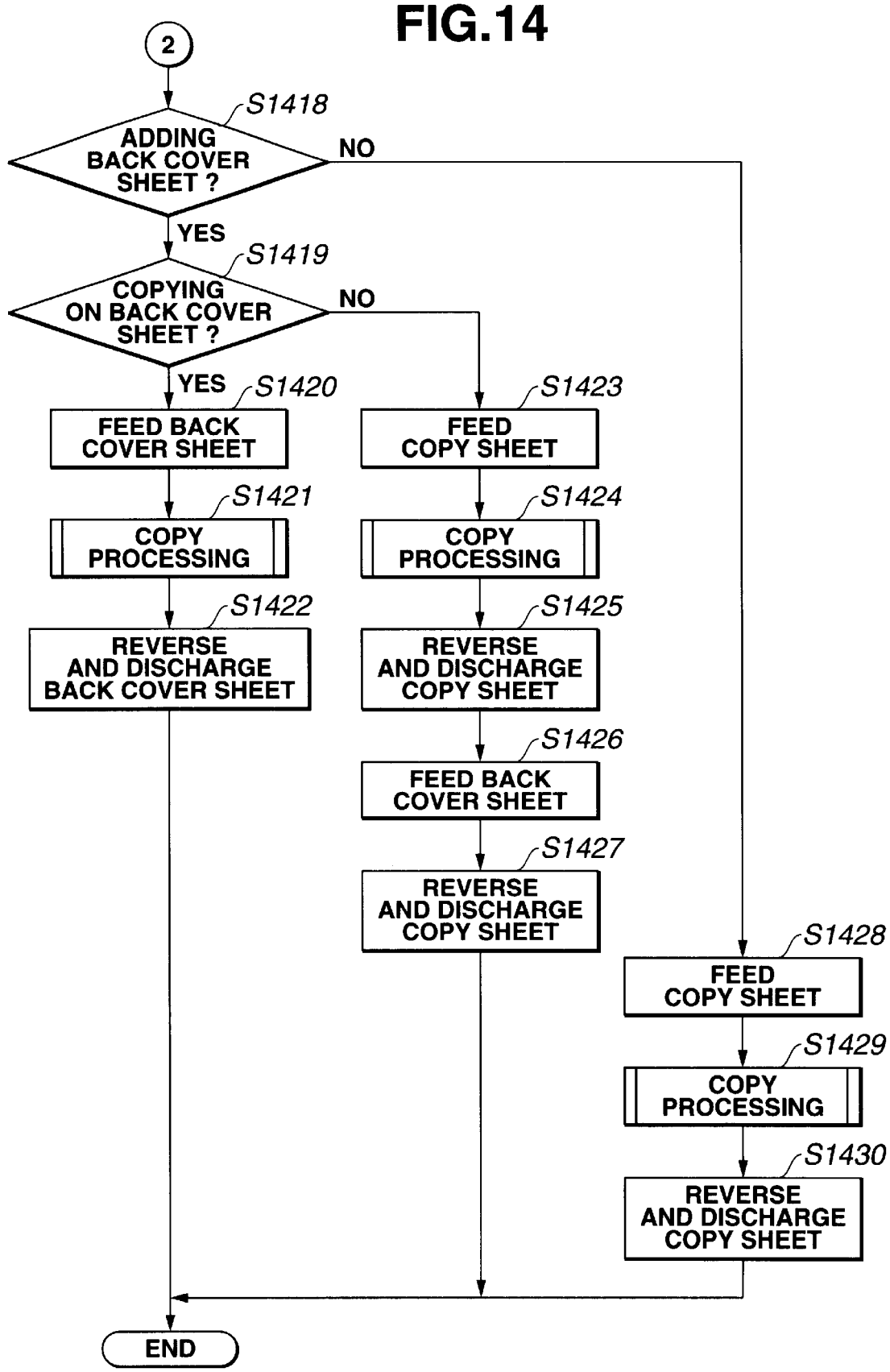
FIG. 14 shows a flowchart for executing a cover/sheet insertion mode.

FIGS. 12 to 14 are flowcharts for executing the cover/sheet insertion mode. The cover/sheet insertion mode comprises a cover sheet feeding phase, an insert sheet feeding phase, and a back cover sheet feeding phase. The cover sheet feeding phase is shown in FIG. 12. The insert sheet feeding phase is shown in FIG. 13. The back cover sheet feeding phase is shown in FIG. 14.

First, the cover sheet feeding phase will be explained. CPU 171 discriminates whether adding the cover sheet is designated (S1201). If adding the cover sheet is not designated, CPU 171 proceeds to the insert sheet feeding phase. If adding the cover sheet is designated, CPU 171 discriminates whether the copy processing should be done on the cover sheet (S1202). If the copy processing should be done on the cover sheet, CPU 171 controls document feeder 180 to feed a document (S1203) and controls the feed of the cover sheet from the designated feed unit (S1204). Then, CPU 171 controls copying of the document onto the cover sheet (S1205). CPU 171 controls reversing the cover sheet and discharging the cover sheet (S1206). If the copy processing should not be done on the cover sheet at step S1202, CPU 171 controls the feed of the cover sheet from the designated feed unit (S1207) and proceeds to step S1206.

Then, CPU 171 proceeds to the insert sheet feeding phase. CPU 171 controls document feeder 180 to feed a document (S1308) and discriminates whether the document fed at step S1308 is the last document (S1309). If the document is the last, CPU 171 proceeds to the back cover sheet feeding phase. If the document is not the last, CPU 171 discriminates whether the insert sheet should be fed at this time in accordance with the designation shown in FIG. 10 (S1310). If the insert sheet should be fed at this time, CPU 171 controls feeding the insert sheet from the designated feed unit (S1311). Then, CPU 171 discriminates whether the copy processing should be done on the insert sheet (S1312). If the copy processing should be done on the insert sheet, CPU 171 controls copying the document onto the insert sheet (S1313). CPU 171 controls reversing the insert sheet and to discharge the insert sheet (S1314). If the copy processing should not be done on the insert sheet at step S1312, CPU 171 proceeds to step S1314. If the insert sheet should be fed at step S1310, CPU 171 controls feeding a copy sheet from the designated sheet feeding unit (S1315). Then, CPU 171 controls copying the document onto the copy sheet (S1316). CPU 171 controls reversing the copy sheet and discharging the copy sheet (S1317). CPU 171 returns to step S1308 after step S1314 or step S1317. That is, the insert sheet feeding phase is repeated until the last document is fed.

Then, CPU 171 proceeds to the back cover sheet feeding phase. CPU 171 discriminates whether adding the back cover sheet is designated (S1418). If adding the back cover sheet is designated, CPU 171 discriminates whether the copy processing should be done on the back cover sheet (S1419). If the copy processing should be done on the back cover sheet, CPU 171 controls feeding the back cover sheet from the designated feed unit (S1420). Then, CPU 171 controls copying the document onto the back cover sheet (S1421). CPU 171 controls reversing the back cover sheet and discharging the back cover sheet (S1422).

If the copy processing should not be done on the back cover sheet at step S1419, CPU 171 controls feeding a copy sheet from the designated feeding unit (S1423) and copying the document onto the copy sheet (S1424). Then, CPU 171 controls reversing of the copy sheet and discharging the copy sheet (S1425). CPU 171 controls feeding the back cover sheet from the designated feeding unit (S1426). CPU 171 controls reversing the back cover sheet and discharging the back cover sheet (S1427).

If adding the back cover sheet is not designated at step S1418, CPU 171 controls feeding a copy sheet from the designated feeding unit (S1428) and copying the document onto the copy sheet (S1429). Then, CPU 171 controls reversing the copy sheet and discharging the copy sheet (S1430). Since the scanned image data are stored on hard disc 404 of image memory unit 3, even if a plurality of sets of copies should be made, it is enough to execute steps S1203 and S1308 once. After first copy processing is done, steps S1203 and S1308 can be omitted, and the image data stored in hard disc 404 are read out and are printed out.

The different size document mode will be described hereinafter. When different size document mode key 702 is touched, the different size document mode is alternately set or reset. The different size document mode is used when the width of documents set on document tray 181 are the same but the length of some of the documents are different from the others. As described before, documents set on document feeder 180 are fed to plate glass 101. The length of the document is detected by sensor 184 provided on the feeding path of document feeder 180 during the document moving. The width of the document is detected by detecting the distance of a pair of document guides 185 provided on document tray 181.

When the different size documents mode is not set, the size of only the first document is detected. On the other hand, when the different size document mode is set, the sizes of all documents set on document tray 181 are detected. The sheet feeding unit is selected automatically in accordance with the size detection.

Figure 15:
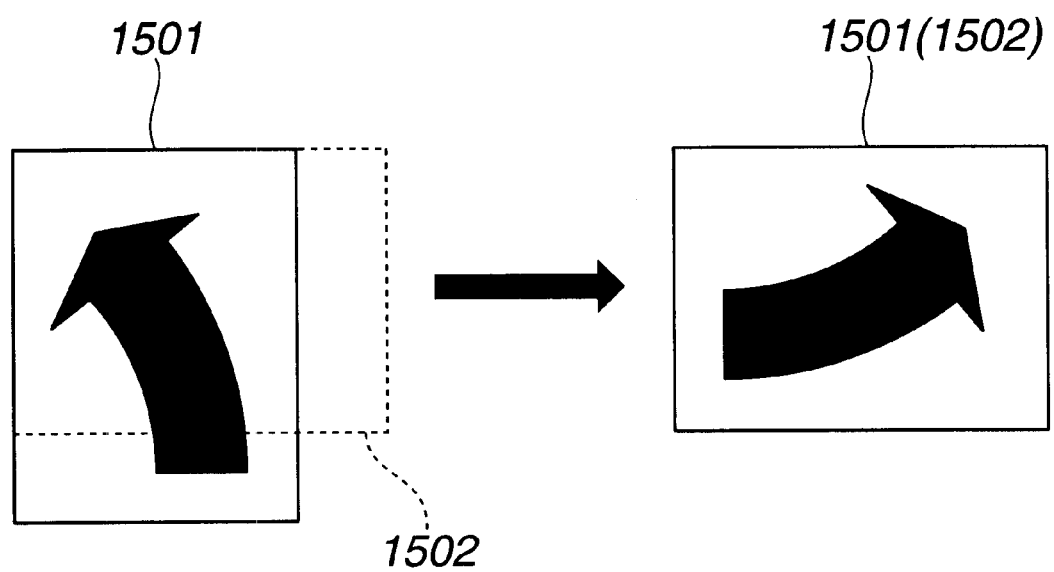
FIG. 15 shows an image rotation.
Figure 16:
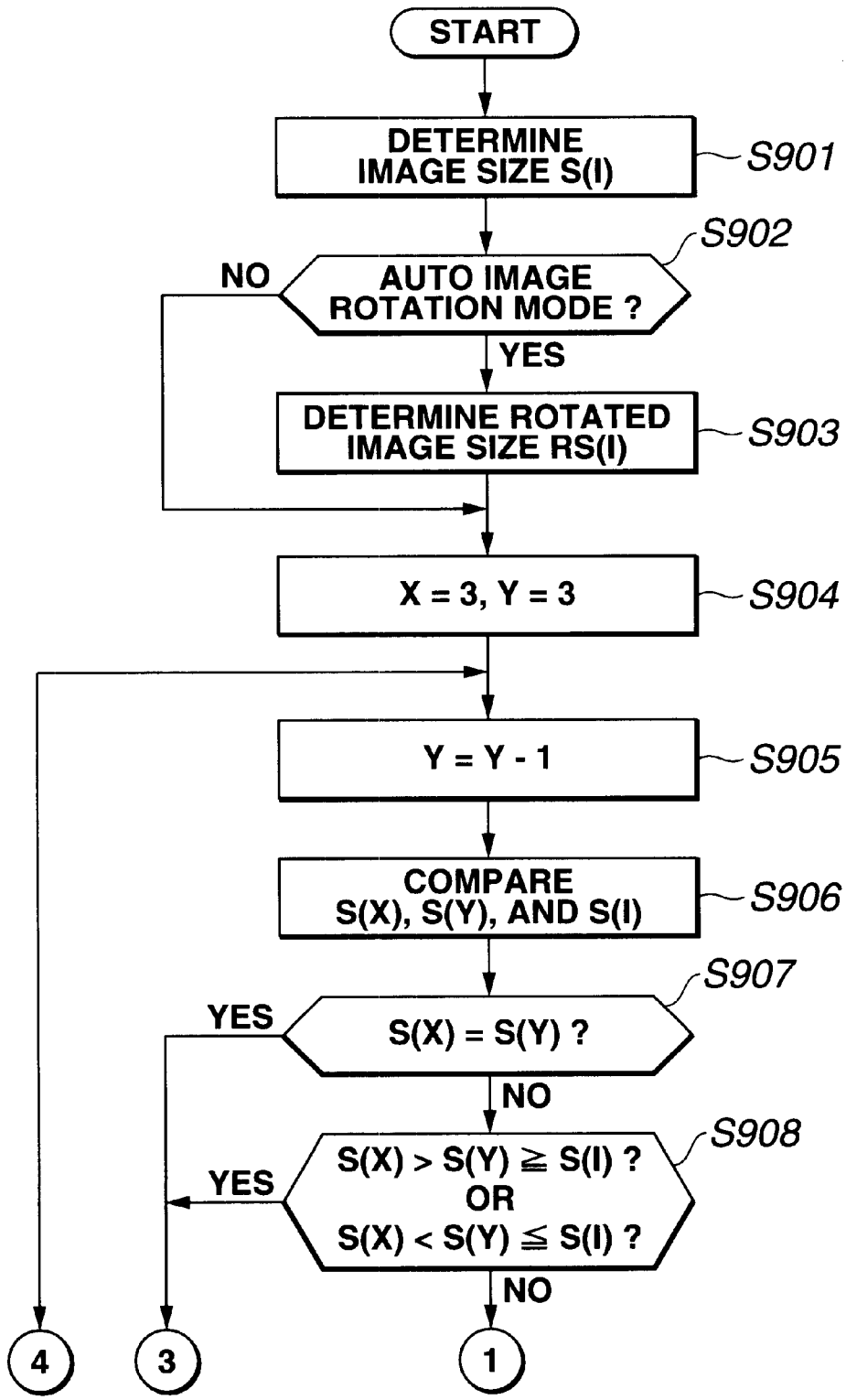
FIG. 16 shows a flowchart for executing an auto sheet selection function in the first embodiment.
Figure 17:
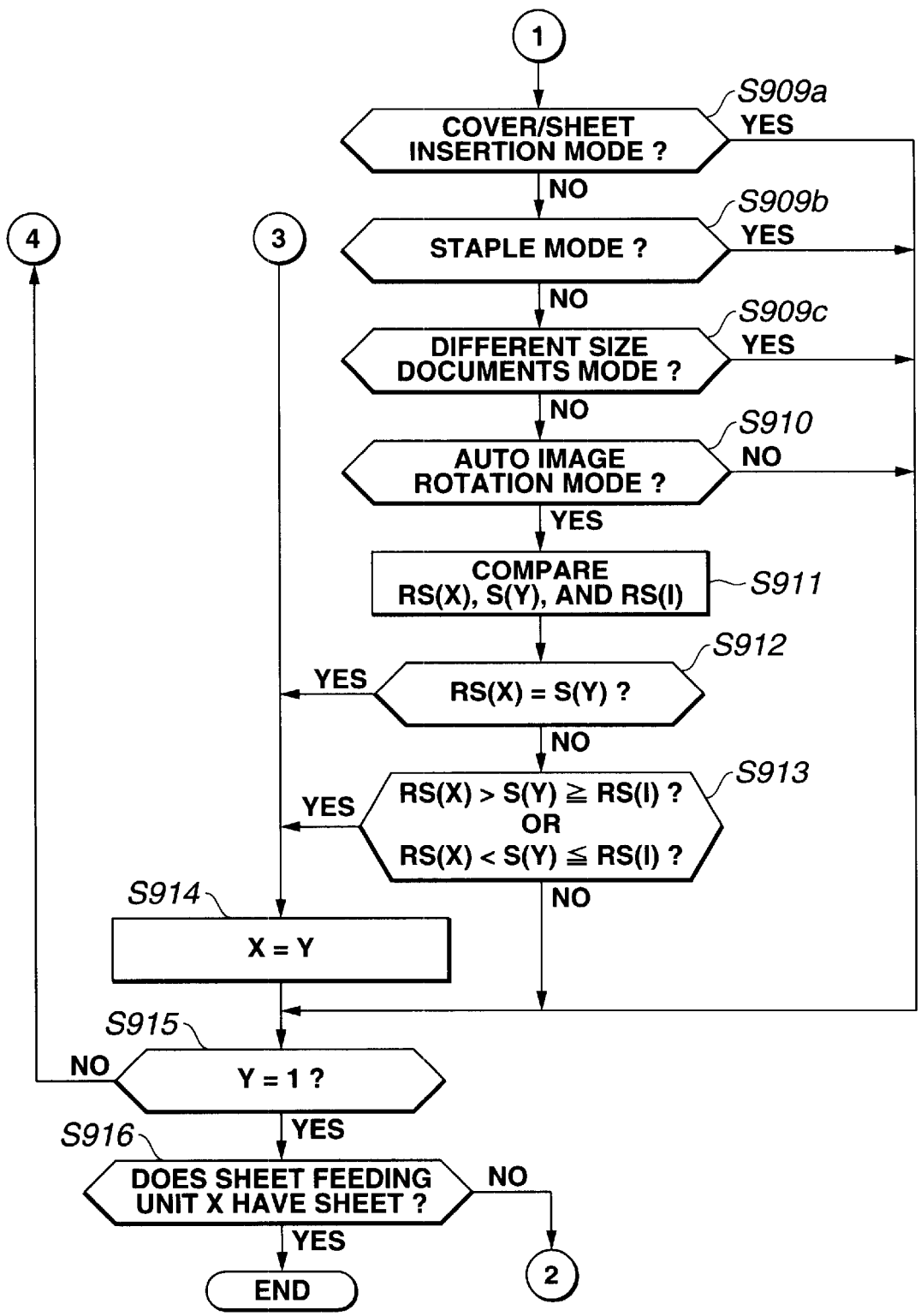
FIG. 17 shows a flowchart for executing an auto sheet selection function in the first embodiment.
Figure 18:
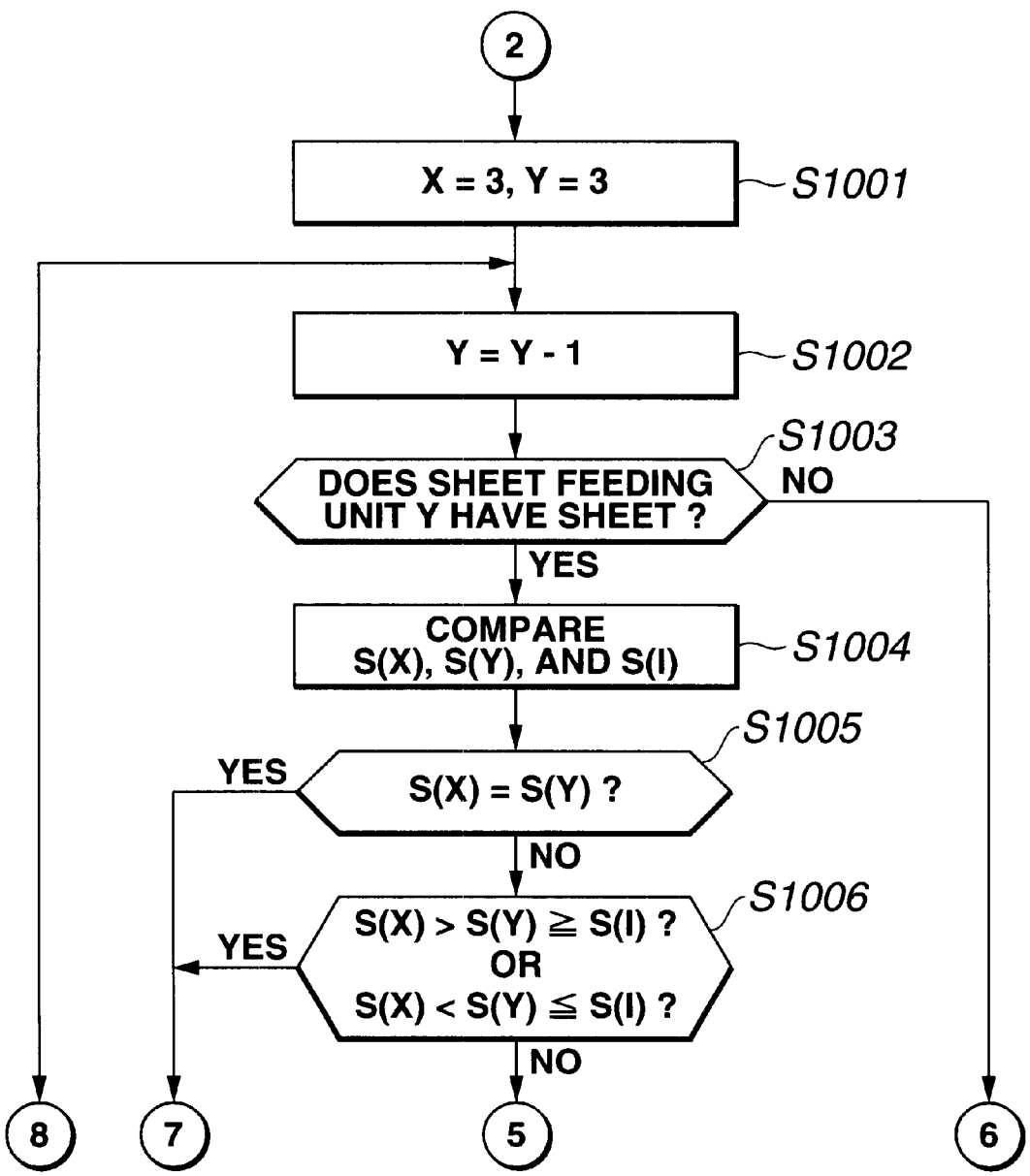
FIG. 18 shows a flowchart for executing an auto sheet selection function in the first embodiment.
Figure 19:
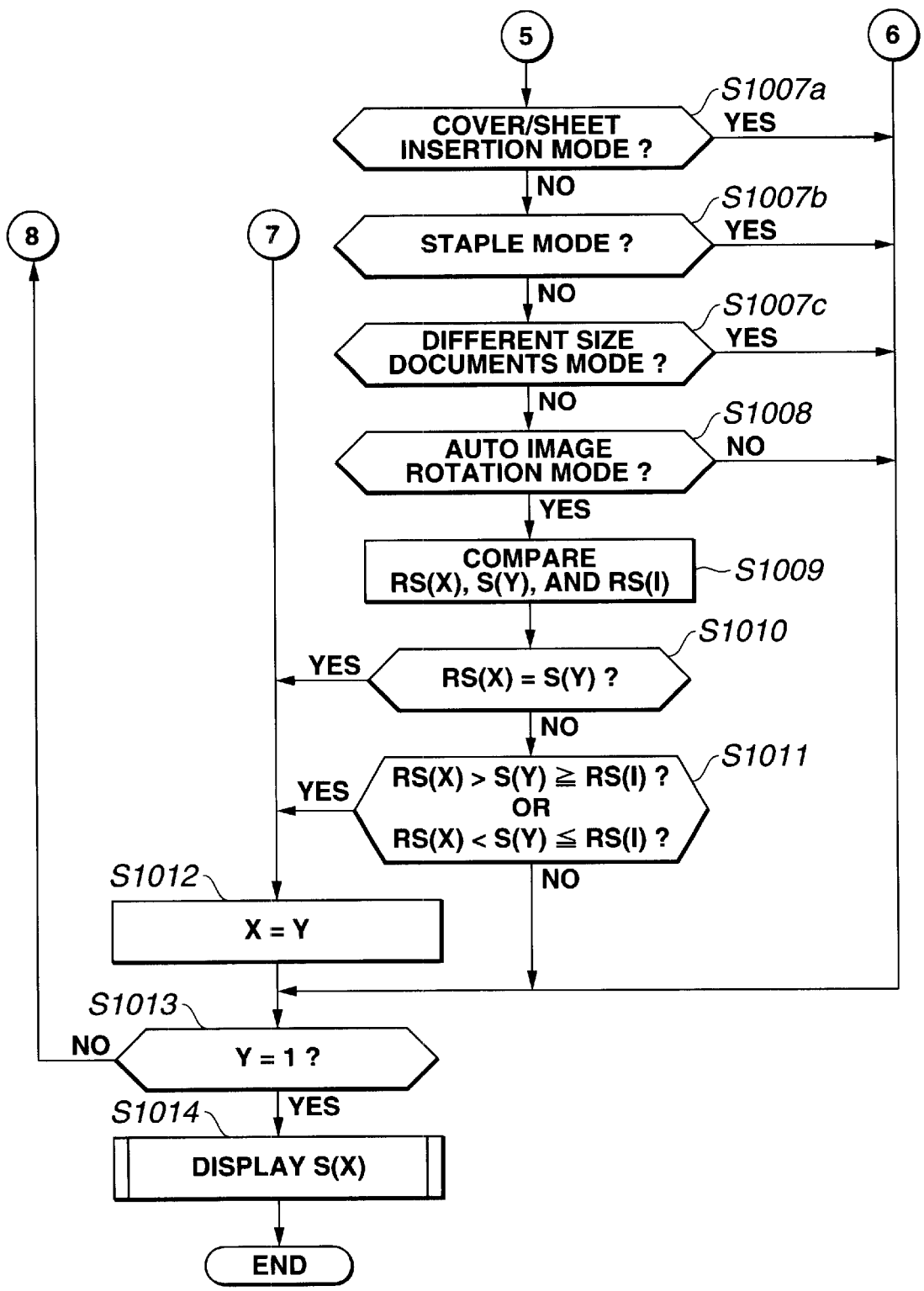
FIG. 19 shows a flowchart for executing an auto sheet selection function in the first embodiment.

The auto image rotation function will be described hereinafter. As described above, the image data read by CCD sensor 109 are sent to printer unit 2 through image memory unit 3. CPU 171 compares the size of the image data stored in page memory 401 with the sizes of the sheets held in the sheet feeding units before the image data stored in image memory unit 3 are sent to printer unit 2. It is assumed that the size of the sheet is M×N and the size of the image is m×n. When $M<N$, $m>n$, $m>M$, $n<M$, and $m<N$, a 90 degree image rotation is done by changing the reading address of image memory unit 3. When M>N, m<n, n>N, m<N, and n<M, the 90 degree image rotation is done. Thereby, the image is copied onto the sheet without lacking the part of the image. This is the auto image rotation function. The example of the auto image rotation function will be described hereinafter with reference to FIG. 15. FIG. 15 shows that document image data are rotated by the auto image rotation function. Numeral 1501 indicates a document image. Numeral 1502 indicates a sheet. Document image 1501 is printed onto sheet 1502 without lacking the part of the image by rotating the document image for 90 degrees.

An auto sheet selection function will be described with reference to FIGS. 16 through 19. The auto sheet selection function is a function which image forming apparatus 100 selects a sheet feeding unit in accordance with the size of image data stored in page memory 401.

CPU 171 determines the size of the image to be printed (S901). The size of image is referred as S(I) hereinafter. If the auto image rotation is designated (S902), CPU 171 also determines the size of the image rotated for 90 degrees (S903). The size of rotated image is referred as RS(I) hereinafter. CPU 171 sets 3 into variable X and sets 3 into variable Y (S904). The variable X and Y indicate sheet feeding units. When X or Y is 1, it means sheet deck 150. When X or Y is 2, it means upper cassette 131. When X or Y is 3, it means lower cassette 132. S(X) indicates the size of sheet held in the sheet feeding unit X. S(Y) indicates the size of sheet held in the sheet feeding unit Y. Then, CPU 171 decrements Y (S905) and compares S(X), S(Y), and S(I) (S906). If S(X) and S(Y) are the same (S907), CPU 171 sets Y into X (S914). If S(X) and S(Y) are not the same at step S907, CPU 171 proceeds to step S908. If the relation S(X)>S(Y)>=S(I) is satisfied or if the relation S(X)<S(Y)<=S(I) is satisfied (S907), CPU 171 proceeds to step S914. Otherwise, CPU 171 proceeds to step S909*a*.

If the cover/sheet insertion mode is not designated (S909*a*) and if the staple mode is not designated (S909*b*) and if the different size documents mode is not designated (S909*c*), CPU 171 discriminates if the auto image rotation mode is designated (S910). If the auto image rotation mode is designated, CPU 171 compares RS(X), S(Y), and RS(I) (S911). RS(X) indicates the rotated size of sheet held in the sheet feeding unit X. If RS(X) and S(Y) are the same (S912), CPU 171 proceeds to step S914. If RS(X) and S(Y) are not the same at step S912, CPU 171 proceeds to step S913. If the relation RS(X)>S(Y)>=RS(I) is satisfied or if the relation RS(X)<S(Y)<=RS(I) is satisfied (S913), CPU 171 proceeds to step S914. Otherwise, CPU 171 proceeds to step S915. If the cover/sheet insertion mode is designated at step S909*a* or if the staple mode is designated at step S909*b* or if the different size documents mode is designated at step S909*c*, CPU 171 proceeds to step S915. If the auto image rotation mode is not designated at step S910, CPU 171 proceeds to step S915.

If Y is not 1 at step S915, CPU 171 returns to step S905. If Y is 1 at step S915, CPU 171 determines if the sheet feeding unit X has no sheet (S916). If the sheet feeding unit X has a sheet, CPU 171 controls image forming apparatus 100 to form the image on the sheet held in the sheet feeding unit X. If the sheet feeding unit X has no sheet, CPU 171 proceeds to step S1001.

CPU 171 sets 3 into X and sets 3 into Y (S1001). Then, CPU 171 decrements Y (S1002) and discriminates if the sheet feeding unit X has a sheet (S1003). If the sheet feeding unit X has a sheet, CPU 171 compares S(X), S(Y), and S(I) (S1004). If S(X) and S(Y) are the same (S1005), CPU 171 sets Y into X (S1012). If S(X) and S(Y) are not the same at step S1010, CPU 171 proceeds to step S1011. If the relation S(X)>S(Y)>=S(I) is satisfied or if the relation S(X)<S(Y) <=S(I) is satisfied (S1006), CPU 171 proceeds to step S1012. Otherwise, CPU 171 proceeds to step S1007*a*.

If the cover/sheet insertion mode is not designated (S1007*a*) and if the staple mode is not designated (S1007*b*) and if the different size documents mode is not designated (S1007*c*), CPU 171 discriminates if the auto image rotation mode is designated (S1008). If the auto image rotation mode is designated, CPU 171 compares RS(X), S(Y), and RS(I) (S1009). RS(X) indicates the rotated size of sheet held in the sheet feeding unit X. If RS(X) and S(Y) are the same (S1010), CPU 171 proceeds to step S1012. If RS(X) and S(Y) are not the same at step S1010, CPU 171 proceeds to step S1011. If the relation RS(X)>S(Y)>=RS(I) is satisfied or if the relation RS(X)<S(Y)<=RS(I) is satisfied (S1011), CPU 171 proceeds to step S1012. Otherwise, CPU 171 proceeds to step S1013. If the cover/sheet insertion mode is designated at step S1007*a* or if the staple mode is designated at step S1007*b* or if the different size documents mode is designated at step S1007*c*, CPU 171 proceeds to step S1013. If the auto image rotation mode is not designated at step S1008, CPU 171 proceeds to step S1013.

If Y is not 1 at step S1013, CPU 171 returns to step S1002. If Y is 1 at step S1013, CPU 171 controls displaying the size of sheet held in the sheet feeding unit X (S1014).

Another embodiment will be described hereinafter in reference to FIG. 20. S(X), RS(X), and S(I) are the same meaning as the above embodiment. CPU 171 sets 1 into variable X (S2001). CPU 171 compares S(X) and S(I) (S2002). If S(X) and S(I) are the same, CPU 171 discriminates if the sheet feeding unit X has a sheet (S2003). If the sheet feeding unit X has a sheet, CPU 171 controls forming the image on a sheet fed from the sheet feeding unit X without the 90 degree rotation (S2004).

If S(X) and S(I) are not the same at step S2002 and if the sheet feeding unit X does not have a sheet at step S2003, CPU 171 discriminates if X is 3 (S2005). If X is not 3, CPU 171 adds 1 to X (S2006) and returns to step S2002.

If X is 3 at step S2005, CPU 171 discriminates if the auto image rotation mode is designated (S2007). If the auto image rotation mode is designated, CPU 171 discriminates if the cover/sheet insertion mode, the staple mode, and the different size document mode are designated (S2008 to S2010). If none of the cover/sheet insertion mode, the staple mode, and the different size document mode is designated, CPU 171 sets 1 into X (S2011). Then, CPU 171 compares S(X) and RS(I) (S2012). If S(X) and RS(I) are the same, CPU 171 discriminates if the sheet feeding unit X has a sheet (S2013). If the sheet feeding unit X has a sheet, CPU 171 controls forming the image on a sheet fed from the sheet feeding unit X with the 90 degree rotation (S2014).

If S(X) and RS(I) are not the same at step S2012 and if the sheet feeding unit X does not have a sheet at step S2013, CPU 171 discriminates if X is 3 (S2015).

If X is not 3, CPU 171 adds 1 to X (S2016) and returns to step S2012.

If X is 3 at step S2015, if the auto image rotation is not designated at step S2007, or if one of the cover/sheet insertion mode, the staple mode, and the different size document mode is designated at step S2008 to S2010, CPU 171 causes operation panel 172 to display that an optimal sheet is not found (S2017).

What is claimed is:

1. An image forming apparatus comprising:
   a plurality of sheet feeders for feeding a sheet;
   a sheet size detector for detecting a size of the sheet to be fed by at least one of said plurality of sheet feeders, the sheet size including an orientation of the sheet;
   an image size detector for detecting a size of an image to be formed, the image size including an orientation of the image;
   an image rotator for rotating the image in accordance with detection results of said sheet size detector and said image size detector so as to fit the image in the sheet;
   an image forming unit for forming the image on the sheet fed by at least one of said plurality of sheet feeders;
   a terminal for inputting a designation for feeding sheets by at least two of said plurality of sheet feeders during an image forming job; and
   an inhibitor for inhibiting the image rotation by said image rotator in a case where the designation is inputted from said terminal.

2. An image forming apparatus according to claim 1, wherein said image rotator rotates the image or not in accordance with the detection results of said sheet size detector and said image size detector.

3. An image forming apparatus according to claim 1, further comprising a selector for selecting one of said plurality of sheet feeders in accordance with the detection results of said sheet size detector and said image size detector.

4. An image forming apparatus according to claim 3, wherein said selector does not select said sheet feeder having the sheet of which the orientation is different from the orientation of the image in a case where the designation is inputted from said terminal.

5. An image forming apparatus according to claim 4, further comprising a document feeder for feeding a document to a reading position;
   a document size detector for detecting a size of the document; and
   reading means for reading the document at said reading position,
   wherein said image size detector detects a size of the image to be formed in accordance with a result of said document size detector, and said image forming unit forms an image read by said reading means on the sheet fed from said selected sheet feeder.

6. An image forming apparatus according to claim 1, wherein the designation is for causing a predetermined sheet to be fed from a predetermined sheet feeder at a predetermined page and another sheet to be fed from the sheet feeder selected among said plurality of sheet feeders except from said predetermined sheet feeder.

7. An image forming apparatus according to claim 6, wherein the predetermined sheet is one of a cover sheet and an insert sheet.

8. An image forming method comprising:
   detecting a size of a sheet to be fed by at least one of a plurality of sheet feeders, the sheet size including an orientation of the sheet;
   detecting a size of an image to be formed, the image size including an orientation of the image;
   rotating the image in accordance with detection results of said sheet size detector and image size detector so as to fit the image in the sheet;
   inputting a designation for feeding sheets by at least two of said plurality of sheet feeders during an image formation job;
   inhibiting the image rotation in a case where the designation is inputted from said terminal; and
   forming the image on the sheet fed by said selected sheet feeder.

9. An image forming method according to claim 8, wherein the image rotation is in accordance with the detection results of the sheet size and the image size.

10. An image forming method according to claim 8, further comprising a step of selecting one of a plurality of sheet feeders in accordance with the detected sheet size and the detected image size.

11. An image forming method according to claim 10, wherein the sheet feeder feeding the sheet having the orientation different from the orientation of an image in a case where the designation is inputted from said terminal is not selected.

12. An image forming method according to claim 11, further comprising the steps of feeding a document to a reading position;
   detecting a size of the document; and
   reading the document at said reading position,
   wherein the size detected is a size of the image to be formed in accordance with a result of said document size detection, and the image formed is an image read on the sheet fed from said selected sheet feeder.

13. An image forming method according to claim 8, wherein the input designation is for causing a predetermined sheet to be fed from a predetermined sheet feeder at a predetermined page and another sheet to be fed from the sheet feeder selected from among said plurality of sheet feeders except for said predetermined sheet feeder.

14. An image forming method according to claim 13, wherein the predetermined sheet is one of a cover sheet and an insert sheet.

15. An image forming method comprising the steps of:
   feeding a sheet from one of a plurality of sheet feeders;
   detecting a size of the sheet to be fed by at least one of the plurality of sheet feeders, the sheet size including an orientation of the sheet;
   detecting a size of an image to be formed, the image size including an orientation of the image;
   selecting one of the plurality of sheet feeders in accordance with the sheet size and the image size detection results;
   rotating the image so as to fit the image in the sheet fed by the selected sheet feeder;
   forming the image on the sheet fed by the selected sheet feeder, the image being either non-rotated image or a rotated image; and
   inputting a designation for feeding sheets by at least two of said plurality of sheet feeders during an image formation job;
   wherein the selecting is among said sheet feeders having the sheet of which the orientation is same as the orientation of image in a case where the designation is inputted from said terminal, and among said sheet feeders having the sheet of which the orientation is either same as the orientation of image or different from the orientation of image in a case where the designation is not inputted from said terminal.

16. An image forming method according to claim 15, wherein the designation is for feeding a predetermined sheet from a predetermined sheet feeder at a predetermined page, and for feeding another sheet from the sheet feeder selected among said plurality of sheet feeders other than said predetermined sheet feeder at a page other than the predetermined page.

17. An image forming method according to claim 16, wherein the predetermined sheet is at least one of a cover sheet and an insert sheet.

18. An image forming method according to claim 15, further comprising the steps of reading a document,
wherein said image size detecting includes detecting a size of the document, and
said image forming step forms an image read on the sheet fed from said selected sheet feeder.

19. An image forming method according to claim 18, further comprising the step of feeding a document to a reading position, said feeding step encompassing an ability to feed a plurality size of documents during image formation.

20. An image forming method according to claim 15, wherein said image forming forms an image scanned by a scanner and/or an image inputted from a computer.

21. An image forming method comprising the steps of:
feeding a sheet from one of a plurality of sheet feeders;
selecting one of the plurality of sheet feeders in accordance with a size of sheets held by the plurality of sheet feeders and a size of their image, the size of sheet including an orientation and the size of image including an orientation;
rotating the image so as to fit the image in the sheet fed by the selected sheet feeder;
forming the image on the sheet fed by the selected sheet feeder, the image being either a non-rotated image or a rotated image; and
inputting thru a terminal a designation for feeding sheets by at least two of said plurality of sheet feeders during an image formation job;
wherein the sheet feeder is selected from among said sheet feeders having the sheet of which the orientation is the same as the orientation of image in a case where the designation is inputted, and selected sheet feeder is among said sheet feeders having the sheet of which the orientation is either the same as the orientation of image or different from the orientation of image in a case where the designation is not inputted from said terminal.

22. An image forming method comprising the steps of:
feeding a sheet from one of a plurality of sheet feeders;
selecting one of the plurality of sheet feeders in accordance with a size of sheets held by the plurality of sheet feeders and a size of their image, the size of sheet including an orientation and the size of image including an orientation;
rotating the image so as to fit the image in the sheet fed by the selected sheet feeder;
forming the image on the sheet fed by the selected sheet feeder, the image being either a non-rotated image or a rotated image; and
inputting thru a terminal a designation for feeding a predetermined sheet from a predetermined sheet feeder among said plurality of sheet feeders at a predetermined page, and for feeding another sheet from the sheet feeder among said plurality of sheet feeders other than the said predetermined sheet feeder at a page other than the predetermined page;
wherein the selected sheet feeder is among the sheet feeders having the sheet of which the orientation is the same as the orientation of image in a case where the designation is inputted from said terminal.

23. An image forming method according to claim 22, wherein said image forming step forms an image scanned by a scanner and/or an image inputted from a computer.

24. An image forming method according to claim 22, wherein the selected sheet feeder is among the sheet feeders having the sheet of which the orientation is either the same as the orientation of the image or different from the orientation of the image in a case where designation is not inputted from said terminal.

25. An image forming method comprising the steps of:
feeding a sheet from one of a plurality of sheet feeders;
selecting one of the plurality of sheet feeders in accordance with a size of sheets held by the plurality of sheet feeders and a size of their image, the size of sheet including an orientation and the size of image including an orientation;
rotating the image so as to fit the image in the sheet fed by said sheet feeder selected by said selector;
forming the image on the sheet fed by the selected sheet feeder, the image being either a non-rotated image or a rotated image;
inputting thru a terminal a designation for feeding a predetermined sheet from a predetermined sheet feeder among said plurality of sheet feeders at a predetermined page, and for feeding another sheet from the sheet feeder among said plurality of sheet feeders other than said predetermined sheet feeder at a page other than the predetermined page; and
inhibiting the selecting step to select said sheet feeder having the sheet of which the orientation is different from the orientation of the image in a case where the designation is inputted from said terminal.

26. An image forming method according to claim 25, wherein said image forming step forms an image scanned by a scanner and/or an image inputted from a computer.

27. An image forming method comprising the steps of:
feeding a sheet from one of a plurality of sheet feeders;
selecting one of the plurality of sheet feeders in accordance with a size of sheets held by the plurality of sheet feeders and a size of their image, the size of sheet including an orientation and the size of image including an orientation;
rotating the image so as to fit the image in the sheet fed by the selected sheet feeder;
forming the image on the sheet fed by the selected sheet feeder, the image being either a non-rotated image or a rotated image; and
inputting thru a terminal a designation for forming images having a plurality of sizes during an image formation job;
wherein the selected sheet feeder is among the sheet feeders having the sheet of which the orientation is the same as the orientation of image in a case where the designation is inputted from said terminal.

28. An image forming method according to claim 27, wherein said image forming forms an image scanned by a scanner and/or an image inputted from a computer.

29. An image forming method according to claim 27, wherein the selected sheet feeder is among the sheet feeders having the sheet of which the orientation is either the same as the orientation of the image or different from the orientation of the image in a case where designation is not inputted from said terminal.

30. An image forming method comprising the steps of:
feeding a sheet from one of a plurality of sheet feeders;
selecting one of the plurality of sheet feeders in accordance with a size of sheets held by the plurality of sheet feeders and a size of their image, the size of sheet including an orientation and the size of image including an orientation;

rotating the image so as to fit the image in the sheet fed by the selected sheet feeder;

forming the image on the sheet fed by the selected sheet feeder, the image being either a non-rotated image or a rotated image;

inputting thru a terminal a designation for forming images having a plurality of sizes during an image formation job; and inhibiting the selecting step to select the sheet feeder having the sheet of which the orientation is different from the orientation of an image in a case where the designation is inputted from said terminal.

31. An image forming method according to claim 30, wherein said image forming forms an image scanned by a scanner and/or an image inputted from a computer.

32. An image forming apparatus comprising:

a plurality of sheet feeders for feeding a sheet;

a sheet size detector for detecting a size of the sheet to be fed by at least one of said plurality of sheet feeders, the sheet size including an orientation of the sheet;

an image size detector for detecting a size of an image to be formed, the image size including an orientation of the image;

a selector for selecting one of said plurality of sheet feeders in accordance with detection results of said sheet size detector and said image size detector;

an image rotator for rotating the image so as to fit the image in the sheet fed by said sheet feeder selected by said selector;

an image forming unit for forming the image on the sheet fed by said sheet feeder selected by said selector, the image being either a non-rotated image or a rotated image; and a terminal for inputting a designation for feeding sheets by at least two of said plurality of sheet feeders during an image formation job;

wherein said selector selects said sheet feeder from among said sheet feeders having the sheet of which the orientation is same as the orientation of an image in a case where the designation is inputted from said terminal, and selects said sheet feeder from among said sheet feeders having the sheet of which the orientation is either the same as the orientation of image or different from the orientation of image in a case where the designation is not inputted from said terminal.

33. An image forming apparatus according to claim 32, wherein the designation is for feeding a predetermined sheet from a predetermined sheet feeder at a predetermined page, and for feeding another sheet from the sheet feeder selected among said plurality of sheet feeders other than said predetermined sheet feeder at a page other than the predetermined page.

34. An image forming apparatus according to claim 33, wherein the predetermined sheet is at least one of a cover sheet and an insert sheet.

35. An image forming apparatus according to claim 32, further comprising reading means for reading a document, wherein said image size detector includes a document size detector for detecting a size of the document, and wherein said image forming unit forms an image read by said reading means on the sheet fed from said selected sheet feeder.

36. An image forming apparatus according to claim 35, further comprising a document feeder for feeding a document to said reading means, said document feeder being able to feed a plurality size of documents during the image formation job.

37. An image forming apparatus according to claim 32, wherein said image forming unit forms an image scanned by a scanner and/or an image inputted from a computer.

38. An image forming apparatus comprising:

a plurality of sheet feeders for feeding a sheet;

a selector for selecting one of said plurality of sheet feeders in accordance with a size of sheets had by said plurality of sheet feeders and a size of the image, the size of the sheet including an orientation and the size of the image including an orientation;

an image rotator for rotating the image so as to fit the image in the sheet fed by said sheet feeder selected by said selector;

an image forming unit for forming the image on the sheet fed by said sheet feeder selected by said selector, the image being either a non-rotated image or a rotated image; and a terminal for inputting a designation for feeding sheets by at least two of said plurality of sheet feeders during an image formation job;

wherein said selector selects said sheet feeder from among said sheet feeders having the sheet of which the orientation is same as the orientation of image in a case where the designation is inputted from said terminal, and selects said sheet feeder from among said sheet feeders having the sheet of which the orientation is either same as the orientation of the image or different from the orientation of image in a case where the designation is not inputted from said terminal.

39. An image forming apparatus comprising:

a plurality of sheet feeders for feeding a sheet;

a selector for selecting one of said plurality of sheet feeders in accordance with a size of sheets had by said plurality of sheet feeders and a size of an image, the size of the sheet including an orientation and the size of the image including an orientation;

an image rotator for rotating the image so as to fit the image in the sheet fed by said sheet feeder selected by said selector;

an image forming unit for forming the image on the sheet fed by said sheet feeder selected by said selector, the image being either a non-rotated image or a rotated image; and a terminal for inputting a designation for feeding a predetermined sheet from a predetermined sheet feeder from among said plurality of sheet feeders at a predetermined page, and for feeding another sheet from the sheet feeder from among said plurality of sheet feeders other than said predetermined sheet feeder at a page other than the predetermined page;

wherein said selector selects said sheet feeder from among said sheet feeders having the sheet of which the orientation is same as the orientation of the image in a case where the designation is inputted from said terminal.

40. An image forming apparatus according to claim 39, wherein said image forming unit forms an image scanned by a scanner and/or an image inputted from a computer.

41. An image forming apparatus according to claim 39, wherein said selector selects said sheet feeder from among said sheet feeders having the sheet of which the orientation is either the same as the orientation of the image or different from the orientation of the image in a case where designation is not inputted from said terminal.

42. An image forming apparatus comprising:

a plurality of sheet feeders for feeding a sheet;

a selector for selecting one of said plurality of sheet feeders in accordance with a size of sheets held by said plurality of sheet feeders and a size of an image, the size of the sheet including an orientation and the size of the image including an orientation;

an image rotator for rotating the image so as to fit the image in the sheet fed by said sheet feeder selected by said selector;

an image forming unit for forming the image on the sheet fed by said sheet feeder selected by said selector, the image being either a non-rotated image or a rotated image;

a terminal for inputting a designation for feeding a predetermined sheet from a predetermined sheet feeder from among said plurality of sheet feeders at a predetermined page, and for feeding another sheet from the sheet feeder from among said plurality of sheet feeders other than said predetermined sheet feeder at a page other than the predetermined page; and an inhibitor for inhibiting said selector to select said sheet feeder having the sheet of which the orientation is different from the orientation of the image in a case where the designation is inputted from said terminal.

43. An image forming apparatus according to claim 42, wherein said image forming unit forms an image scanned by a scanner and/or an image inputted from a computer.

44. An image forming apparatus comprising:

a plurality of sheet feeders for feeding a sheet;

a selector for selecting one of said plurality of sheet feeders in accordance with a size of sheets held by said plurality of sheet feeders and a size of an image, the size of the sheet including an orientation and the size of the image including an orientation;

an image rotator for rotating the image so as to fit the image in the sheet fed by said sheet feeder selected by said selector;

an image forming unit for forming the image on the sheet fed by said sheet feeder selected by said selector, the image being either a non-rotated image or a rotated image; and a terminal for inputting a designation for forming images having a plurality of sizes during an image formation job;

wherein said selector selects said sheet feeder from among said sheet feeders having the sheet of which the orientation is the same as the orientation of image in a case where the designation is inputted from said terminal.

45. An image forming apparatus according to claim 44, wherein said image forming unit forms an image scanned by a scanner and/or an image inputted from a computer.

46. An image forming apparatus according to claim 44, wherein said selector selects said sheet feeder from among said sheet feeders having the sheet of which the orientation is either the same as the orientation of the image or different from the orientation of the image in a case where designation is not inputted from said terminal.

47. An image forming apparatus comprising:

a plurality of sheet feeders for feeding a sheet;

a selector for selecting one of said plurality of sheet feeders in accordance with a size of sheets held by said plurality of sheet feeders and a size of an image, the size of the sheet including an orientation and the size of the image including an orientation;

an image rotator for rotating the image so as to fit the image on the sheet fed by said sheet feeder selected by said selector;

an image forming unit for forming the image on the sheet fed by said sheet feeder selected by said selector, the image being either a non-rotated image or a rotated image;

a terminal for inputting a designation for forming images having a plurality of sizes during an image formation job; and an inhibitor for inhibiting said selector to select said sheet feeder having the sheet of which the orientation is different from the orientation of image in a case where the designation is inputted from said terminal.

48. An image forming apparatus according to claim 47, wherein said image forming unit forms an image scanned by a scanner and/or an image inputted from a computer.

* * * * *

UNITED STATES PATENT AND TRADEMARK OFFICE
CERTIFICATE OF CORRECTION

PATENT NO. : 6,343,197 B1
DATED : January 29, 2002
INVENTOR(S) : Masahiro Serizawa et al.

It is certified that error appears in the above-identified patent and that said Letters Patent is hereby corrected as shown below:

Column 1,
Line 6, "an" should be deleted.
Line 60, "luck" should read -- lack --.

Column 3,
Line 26, "unit" should read -- units --.
Line 40, "roller" should read -- rollers --.
Line 50, "162" should read -- roller 162 --.
Line 51, "through" should read -- through roller --.

Column 5,
Line 16, "a" should read -- an --.

Column 6,
Line 13, "cassette" should read -- cassettes --.
Line 53, "error" should read -- an error --.

Column 14,
Line 54, "forming" should read -- forming step --.

Column 15,
Line 16, "forming" should read -- forming step --.

Signed and Sealed this

Twenty-third Day of April, 2002

Attest:

*Attesting Officer*

JAMES E. ROGAN
*Director of the United States Patent and Trademark Office*